US012612490B2

(12) United States Patent
Zhao et al.

(10) Patent No.: US 12,612,490 B2
(45) Date of Patent: Apr. 28, 2026

(54) METHOD FOR SEQUENCE CONTROLLABLE BLOCK COPOLYMERIZATION OF CYCLIC ESTER AND EPOXY MONOMERS

(71) Applicant: SOUTH CHINA UNIVERSITY OF TECHNOLOGY, Guangzhou (CN)

(72) Inventors: Junpeng Zhao, Guangdong (CN); Shan Liu, Guangdong (CN); Guangzhao Zhang, Guangdong (CN)

(73) Assignee: SOUTH CHINA UNIVERSITY OF TECHNOLOGY, Guangzhou (CN)

(*) Notice: Subject to any disclaimer, the term of this patent is extended or adjusted under 35 U.S.C. 154(b) by 1088 days.

(21) Appl. No.: 17/641,080

(22) PCT Filed: Sep. 7, 2020

(86) PCT No.: PCT/CN2020/113855

§ 371 (c)(1),
(2) Date: Oct. 24, 2022

(87) PCT Pub. No.: WO2021/043315

PCT Pub. Date: Mar. 11, 2021

(65) Prior Publication Data

US 2023/0212351 A1 Jul. 6, 2023

(30) Foreign Application Priority Data

Sep. 5, 2019 (CN) ......................... 201910838456.8

(51) Int. Cl.

| | |
|---|---|
| ***C08G 65/26*** | (2006.01) |
| ***C08G 63/664*** | (2006.01) |
| ***C08G 63/78*** | (2006.01) |
| ***C08G 63/87*** | (2006.01) |
| ***C08L 63/00*** | (2006.01) |

(52) U.S. Cl.

CPC ....... *C08G 65/2615* (2013.01); *C08G 63/664* (2013.01); *C08G 63/78* (2013.01); *C08G 63/87* (2013.01); *C08G 65/2609* (2013.01); *C08G 65/2654* (2013.01); *C08G 65/2675* (2013.01); *C08L 63/00* (2013.01); *C08G 2650/38* (2013.01)

(58) Field of Classification Search

CPC ............ C08G 65/2615; C08G 65/2654; C08G 2650/38; C08G 63/78; C08G 65/2609; C08G 65/2675; C08G 63/664; C08G 63/87; C08L 63/00

See application file for complete search history.

(56) References Cited

U.S. PATENT DOCUMENTS

2021/0316287 A1* 10/2021 Zhang .................... C08G 63/52

FOREIGN PATENT DOCUMENTS

| | | |
|---|---|---|
| CN | 109096481 | 12/2018 |
| CN | 109517158 | 3/2019 |
| CN | 109776773 | 5/2019 |
| CN | 110498916 | 11/2019 |

* cited by examiner

*Primary Examiner* — Rabon A Sergent
(74) *Attorney, Agent, or Firm* — JCIPRNET

(57) ABSTRACT

The invention provides a method for sequence controllable block copolymerization of a cyclic ester monomer and an epoxy monomer, including: in an inert atmosphere, adding the epoxy monomer and/or the cyclic ester monomer into a catalytic initiating system including an organic base and an alkyl borane for reaction, so as to obtain a sequence controllable polyether-polyester block copolymer of the cyclic ester monomer and the epoxy monomer, i.e. a polyester-b-polyether or a polyether-b-polyester. The invention can prepare various polyether-polyester block copolymers of which the molecular weights, block sequences, block ratios and pendant group combinations can be flexibly adjusted. The invention provides a method for continuously preparing an aliphatic polyester-polyether block copolymer by a one-pot method utilizing a catalytic system of a metal-free Lewis acid-base pair.

3 Claims, 2 Drawing Sheets

METHOD FOR SEQUENCE CONTROLLABLE BLOCK COPOLYMERIZATION OF CYCLIC ESTER AND EPOXY MONOMERS

CROSS-REFERENCE TO RELATED APPLICATION

This application is a 371 application of International PCT application serial no. PCT/CN2020/113855 filed on Sep. 7, 2020, which claims the priority benefit of China application no. 201910838456.8, filed on Sep. 5, 2019. The entirety of each of the above mentioned patent applications is hereby incorporated by reference herein and made a part of this specification.

TECHNICAL FIELD

The invention relates to the field of block copolymer synthesis, and in particular relates to a method for preparing polyether-polyester block copolymers with controllable sequences by a one-pot method using a metal-free catalytic system.

DESCRIPTION OF RELATED ART

The linking sequence of structural units is one of the fundamental determinants of polymer properties. The complex and precise biological functions of natural polymers are largely derived from the precise linking sequences of structural units. Therefore, the synthesis of polymers with controllable sequences has become a new research direction that has attracted much attention, which is full of opportunities, challenges and scientific charm. Block copolymers are an important class of synthetic polymer structures that have great scientific value and a wide range of commercial uses due to their different properties from corresponding homopolymers and blends. The linking sequence of blocks is also crucial for the regulation of the properties of block copolymers, especially end-functionalized and multi-block copolymers. Same comonomers may generate vastly different properties due to different block linking sequences, such as triblock polyethers (Pluronic and reversed Pluronic) composed of polyethylene oxide and polypropylene oxide. Continuous polymerization of comonomers from one initiating site is one of the general and ideal methods for synthesizing block copolymers. However, due to the reactivity ratio of monomers and the applicability and compatibility of different monomers and catalytic/initiating systems, the polymerization sequence is often limited, making it difficult to flexibly adjust block sequences. This makes it difficult to achieve certain block copolymer sequences of some universal/common monomers, or their synthesis has to resort to cumbersome and inefficient post-polymerization modifications, such as polymerization mechanism switching, or end-group coupling, etc.

A typical example is aliphatic polyether-polyester triblock copolymers obtained by continuous ring-opening polymerization. Such block copolymers have shown great research and practical value in the fields of polymer physics and biomedical materials. In particular, triblock copolymers composed of PEO (polyethylene oxide) and PCL/PLA (polycaprolactone/polylactide) have become commercial products, but the most common structure is still polyether in the middle, and polyester on both sides. The currently used catalytic systems and controllable polymerization methods, including two-pot multi-step, one-pot two-step, are limited to first synthesizing polyethers (ring-opening polymerization of epoxies) and then synthesizing polyester segments (ring-opening polymerization of cyclic esters). There are few (or almost no) reports on the reverse and controllable block polymerization of epoxies and cyclic esters, because it is difficult to avoid the transesterification reaction that destroys polyesters and block structures for epoxy controllable polymerization systems. The limitations of synthetic methods make the structures and properties of the block copolymers that can be generated in principle from these common monomers greatly restricted and wasteful. Although reverse block copolymers of PEO and PCL/PLA exhibit vastly different properties and uses from conventional structures, current research and property development are still very limited, and synthetic methods are limited to end-group coupling.

In recent years, organocatalytic polymerization has received more and more attention due to the synthesis of metal-free polymers, the easy availability of catalysts, and the competitiveness in catalytic polymerization efficiency and controllability, especially for ring-opening polymerization. In addition, organocatalytic polymerization also shows a wide range of uses and provides new opportunities in the design of polymer structures and the update and optimization of synthetic strategies. However, the problem of single sequence of epoxy and cyclic ester block copolymers has not been solved. Organocatalytic polymerization of epoxies usually requires the use of strong basic catalysts, such as N-heterocyclic olefin, N-heterocyclic carbene, dendritic phosphazene, and the like. Most of these catalysts can catalyze the ring-opening polymerization of cyclic esters, but they will induce transesterification reactions on polyesters due to too strong alkalinity. That is, when polyethers are grown on polyesters with these catalysts, polyester structures are destroyed. Initiating epoxy polymerization from PCL diols, for example with the phosphazene base t-Bu$P_4$, yields fully randomized comonomer sequences rather than regular polyether-polyester triblocks. Although lowering the catalyst alkalinity can achieve more controllable cyclic ester polymerization, it cannot eliminate the transesterification reaction on polyesters, and the efficiency of epoxy polymerization is too low. Therefore, the key to realize the reverse polymerization of epoxy-cyclic ester is to find a catalytic system for efficient and controllable polymerization of epoxies, so that the polymerization of epoxies can be selectively carried out in a transesterification-free manner in the presence of aliphatic esters.

SUMMARY

In order to solve the above-mentioned deficiencies in the prior art, the purpose of the present invention is to provide a method for preparing polyether-polyester block copolymers with controllable sequences by a one-pot method using a metal-free catalytic system. In this method, macromolecular polyethers or polyesters can be used as initiators to prepare block copolymers with controllable sequences in one pot and one step; or starting from small molecular hydroxy compounds, by adjusting the ratio of acid-base components in the metal-free catalytic system for catalytic conversion to achieve bidirectional selective polymerization of cyclic ester and epoxy monomers, the transesterification reaction is completely inhibited during the epoxy polymerization process; the operation is simple, and the molecular weights, block sequences, block ratios and block combinations of the obtained block copolymers can be precisely regulated.

The object of the present invention is achieved by at least one of the following technical solutions.

The present invention provides a method for sequence controllable block copolymerization of a cyclic ester monomer and an epoxy monomer, comprising: in an inert atmosphere, adding the epoxy monomer and/or the cyclic ester monomer into a catalytic initiating system comprising an organic base and an alkyl borane for reaction, so as to obtain a sequence controllable polyether-polyester block copolymer of the cyclic ester monomer and the epoxy monomer, i.e. a polyester-b-polyether (polyester first, then polyether) or a polyether-b-polyester (polyether first, then polyester).

Preferably, the method comprises: in an inert atmosphere, adding the epoxy monomer into a catalytic initiating system comprising a hydroxyl-terminated polyester, an organic base and an alkyl borane for reaction, so as to obtain a polyester-b-polyether; or adding the cyclic ester monomer into a catalytic initiating system comprising a hydroxyl-terminated polyether, an organic base and an alkyl borane for reaction, so as to obtain a polyether-b-polyester; where in the catalytic initiating system, a molar ratio of the hydroxyl-terminated polyester, the organic base and the alkyl borane is 1:(0.01-1):(0.01-10); and a molar ratio of the hydroxyl-terminated polyether, the organic base and the alkyl borane is 1:(0.01-1):(0-1).

Preferably, the method comprises: in an inert atmosphere, adding the cyclic ester monomer into a catalytic initiating system comprising a hydroxyl compound and an organic base for reaction, so as to obtain a polyester; then adding an alkyl borane for catalytic conversion, and adding the epoxy monomer for reaction, so as to obtain a polyester-b-polyether, where before the catalytic conversion, a molar ratio of the hydroxyl compound and the organic base in the catalytic initiating system is 1:(0.01-1); and after the catalytic conversion, a molar ratio of the hydroxyl compound, the organic base and the alkyl borane in the catalytic initiating system is 1:(0.01-1):(0.01-10).

Preferably, the method comprises: in an inert atmosphere, adding the cyclic ester monomer and the epoxy monomer into a catalytic initiating system comprising a hydroxyl compound and an organic base for reaction, so as to obtain a polyester; then adding an alkyl borane for catalytic conversion, and continuing to react, so as to obtain a polyester-b-polyether, where before the catalytic conversion, a molar ratio of the hydroxyl compound and the organic base in the catalytic initiating system is 1:(0.01-1); and after the catalytic conversion, a molar ratio of the hydroxyl compound, the organic base and the alkyl borane in the catalytic initiating system is 1: (0.01-1): (0.01-10).

Preferably, the method comprises: in an inert atmosphere, adding the epoxy monomer into a catalytic initiating system comprising a hydroxyl compound, an organic base and an alkyl borane for reaction, so as to obtain a polyether; then adding an organic base for catalytic conversion, and adding the cyclic ester monomer for reaction, so as to obtain a polyether-b-polyester, where before the catalytic conversion, a molar ratio of the hydroxyl compound, the organic base and the alkyl borane in the catalytic initiating system is 1:(0.01-1):(0.01-10), and after the catalytic conversion, a molar ratio of the hydroxyl compound, the organic base and the alkyl borane in the catalytic initiating system is 1:(0.015-20):(0.01-10).

Preferably, the method comprises: in an inert atmosphere, adding the epoxy monomer and the cyclic ester monomer to a catalytic initiating system comprising a hydroxyl compound, an organic base and an alkyl borane for reaction, so as to obtain a polyether; then adding an organic base for catalytic conversion, and continuing to react, so as to obtain a polyether-b-polyester, where before the catalytic conversion, a molar ratio of the hydroxyl compound, the organic base and the alkyl borane in the catalytic initiating system is 1:(0.01-1):(0.01-10), and after the catalytic conversion, a molar ratio of the hydroxyl compound, the organic base and the alkyl borane in the catalytic initiating system is 1:(0.015-20):(0.01-10).

Preferably, the epoxy monomer is selected from more than one of (1) ethylene oxide, (2) linear alkyl ethylene oxide, with an alkyl having 1-20 carbon atoms, (3) linear alkyl glycidol ether, with an alkyl having 1-16 carbon atoms, (4) isopropyl glycidyl ether, (5) tert-butyl glycidyl ether, (6) 2-ethylhexyl glycidyl ether, (7) phenyl glycidyl ether, (8) benzyl glycidyl ether, (9) allyl glycidyl ether, (10) propargyl glycidyl ether, (11) glycidyl methacrylate; the specific structural formulas are as follows:

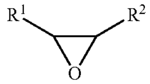 =

(1)

(2)

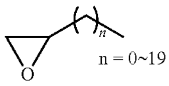

n = 0~19

(3)

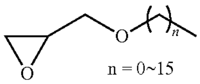

n = 0~15

(4)

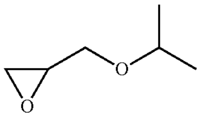

(5)

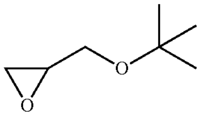

(6)

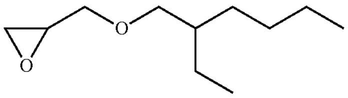

(7)

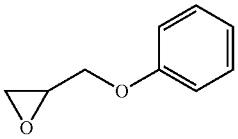

(8)

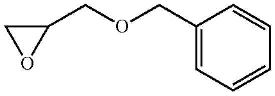

(9)

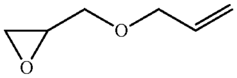

(10)

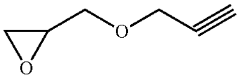

-continued

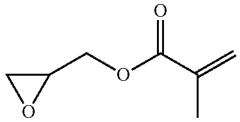

(11)

The cyclic ester monomeris selected from more than one of (1) β-butyrolactone, (2) δ-valerolactone (3) δ-linear alkyl valerolactone, with an alkyl having 1-12 carbon atoms, (4) ε-caprolactone, (5) s-decalactone, (6) rac-lactide, (7) L-lactide, (8) D-lactide, (9) trimethylene carbonate, (10) 5,5-dimethyl-1,3-dioxan-2-one, (11) 5-methyl-5-propyl-1,3-dioxan-2-one; the specific structural formulas are as follows:

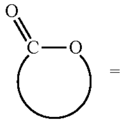

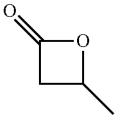

(1)

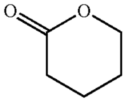

(2)

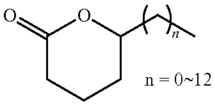

n = 0~12

(3)

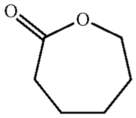

(4)

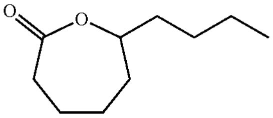

(5)

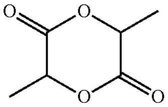

(6)

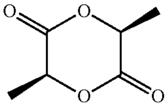

(7)

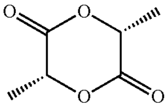

(8)

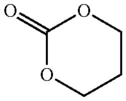

(9)

-continued

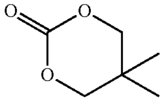

(10)

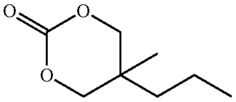

(11)

The organic base includes but is not limited to various tertiary amines (DABCO, PMDETA, $ME_6TREN$, sparteine), amidines (DBN, DBU), guanidines (MTBD, TMG, PMG), triaminophosphines (HMTP, HETP, TMAP, TIPAP) and phosphazene bases (BEMP, t-$BuP_1$, t-$BuP_2$, $EtP_2$, t-$BuP_4$), etc. The specific structural formulas are as follows:

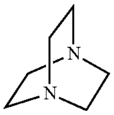

DABCO

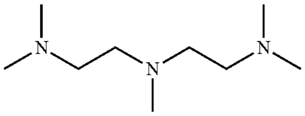

PMDETA

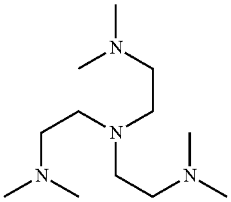

$ME_6TREN$

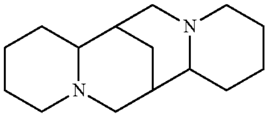

sparteine

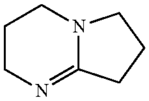

DBN

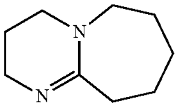

DBU

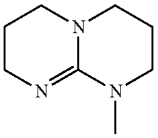

MTBD

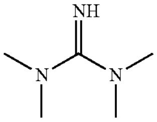

TMG

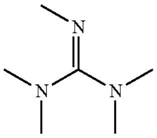

PMG

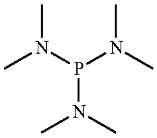

HMTP

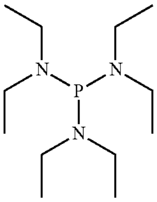

HETP

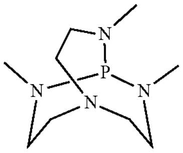

TMAP

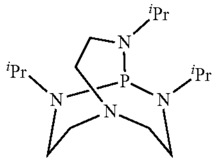

TIPAP

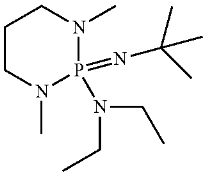

BEMP

-continued

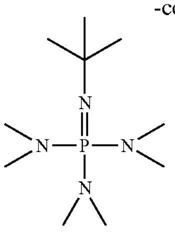

t-BuP1

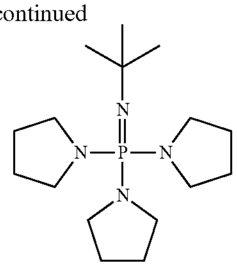

t-BuP1(pyrr)

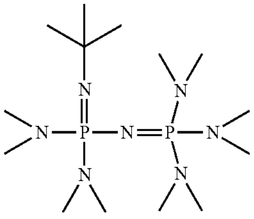

t-BuP2

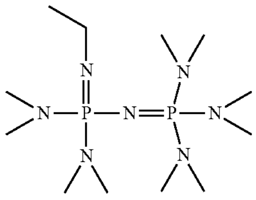

EtP2

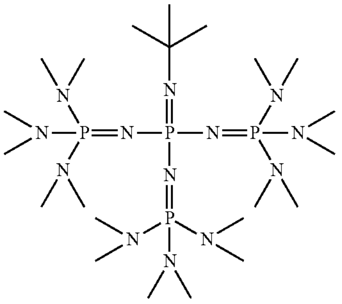

t-BuP4

The alkyl borane includes but is not limited to B-pinocampheyl-9-borabicyclo[3.3.1]nonane (S-Alphine-Borane), tri-sec-butylborane ($T^sBuB$), triisopropylborane ($T^iPrB$), trimethylborane (TMB) and other tri(linear)alkylboranes (TAB; a carbon chain length of 1-8). The specific structural formulas are as follows:

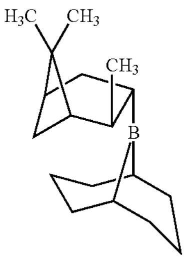

S-Alpine-Borane

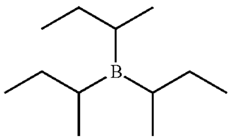

$T^sBuB$

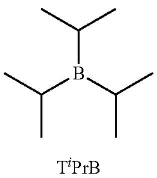

$T^iPrB$

TMB

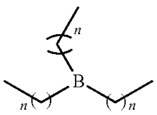

n = 1-7

TAB

Preferably, a molar ratio of the alkyl borane to the organic base during the epoxy polymerization reaction is (1-10):1, and the epoxy polymerization reaction is carried out in a bulk of the epoxy monomer, or in a solvent of cyclic ester, benzene, toluene, tetrahydrofuran, 2-methyltetrahydrofuran, n-hexane, cyclohexane, acetone, N,N-dimethylformamide, N,N-dimethylacetamide or dimethyl sulfoxide; a molar ratio of the alkyl borane to the organic base during the cyclic ester polymerization reaction is (0-1):1, and the cyclic ester polymerization reaction is carried out in a bulk of the cyclic ester monomer, or in a solvent of epoxide, benzene, toluene, tetrahydrofuran, 2-methyltetrahydrofuran, n-hexane, cyclohexane, acetone, N,N-dimethylformamide, N,N-dimethylacetamide or dimethyl sulfoxide; a temperature of the cyclic ester polymerization reaction and the epoxy polymerization reaction is 20-60° C., time for of the cyclic ester polymerization reaction is 0.5-24 h, and time for the epoxy polymerization reaction is 1-48 h, where a concentration of the epoxy monomer in the catalytic initiating system is 3-15 mol/L, and a concentration of the cyclic ester monomer in the catalytic initiating system is 1-15 mol/L.

Preferably, the hydroxyl-terminated polyester includes but is not limited to (1) polycaprolactone, (2) polylactide, (3) polyvalerolactone, (4) polytrimethylene carbonate. A number-average molecular weight of the hydroxyl-terminated polyester is in a range of 1,000-10,000. The specific structural formulas are as follows:

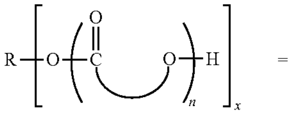

(1)

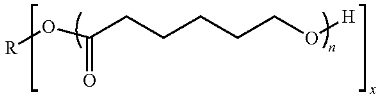

n = 8~85, x = 1, 2, 3, 4 . . .

(2)

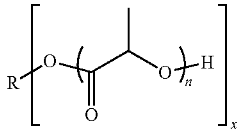

n = 7~70, x = 1, 2, 3, 4 . . .

(3)

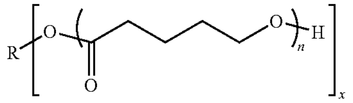

n = 10~100, x = 1, 2, 3, 4 . . .

(4)

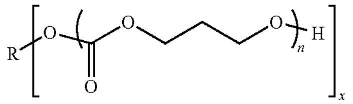

n = 10~100, x = 1, 2, 3, 4 . . .

Preferably, the hydroxyl-terminated polyether includes but is not limited to (1) polyethylene oxide, (2) polypropylene oxide, (3) polybutylene oxide. A number-average molecular weight of the hydroxyl-terminated polyether is in a range of 1,000-10,000. The specific structural formulas are as follows:

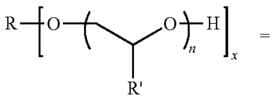

(1)

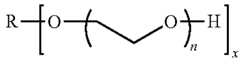

n = 20~200, x = 1, 2, 3, 4 . . .

(2)

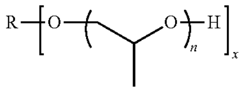

n = 15~180, x = 1, 2, 3, 4 . . .

(3)

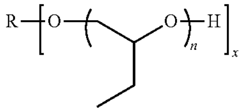

n = 12~140, x = 1, 2, 3, 4 . . .

Preferably, the hydroxyl compound is selected from more than one of (1) methanol and linear alkyl alcohol, (2) isopropanol, (3) 2-butanol, (4) tert-butanol, (5) phenol and 1-phenyl linear alkyl alcohol, (6) allyl alcohol and linear terminal alkenyl 1-ol, (7) 2-allyloxyethanol, (8) 3-methyl-3-buten-1-ol, (9) propargyl alcohol, (10) cholesterol, (11) menthol, (12) 5-ethyl-1,3-dioxane-5-methanol, (13) 3-dimethylamino-1-propanol, (14) linear perfluoroalcohol, (15) betulin, (16) water, (17) n-alkyl glycol, (18) terephthalic alcohol, (19) glycerin, (20) 1,1,1-tris(hydroxymethyl)propane, (21) pentaerythritol, (22) sorbitol, (23) dipentaerythritol, (24) tripentaerythritol, (25) glucose, (26) sucrose, (27) ethylene and vinyl alcohol copolymer, (28) 5-norbornene-2-methanol; and where the linear alkyl alcohol has 2-18 carbon atoms; the 1-phenyl linear alkyl alcohol has 1-10 carbon atoms; the linear terminal alkenyl 1-ol has 2-10 saturated carbon atoms; the linear perfluoroalcohol has 2-12 carbon atoms; and the n-alkyl glycol has 1-18 carbon atoms, and the specific structural formulas are as follows:

(1)

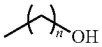

n = 0~17

(2)

(3)

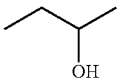

(4)

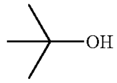

(5)

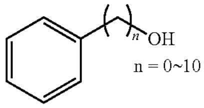

n = 0~10

(6)

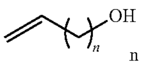

n = 1~10

-continued (7)

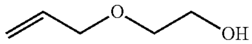

(8)

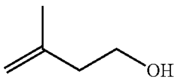

(9)

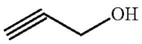

(10)

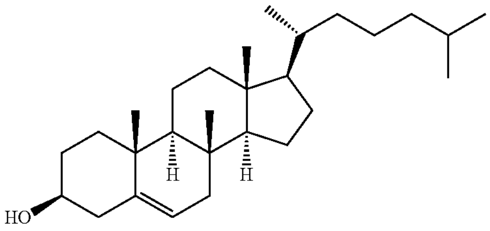

(11)

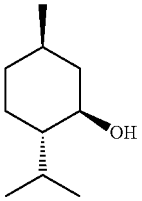

(12)

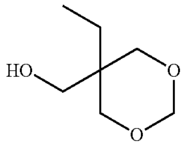

(13)

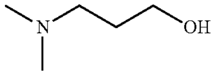

(14)

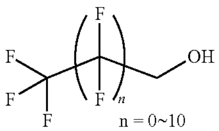

n = 0~10

(15)

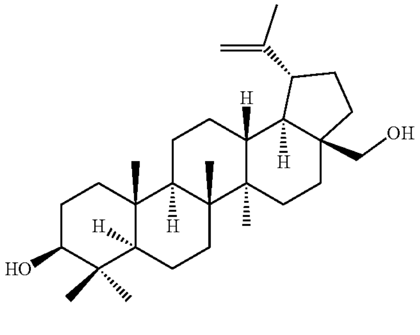

(16)

$H_2O$ (17)

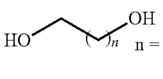

n = 1~17

(18)

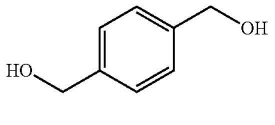

-continued (19)

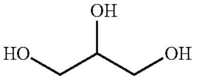

(20)

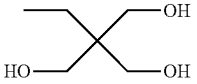

(21)

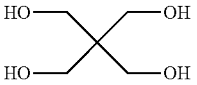

(22)

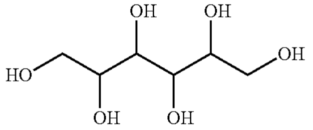

(23)

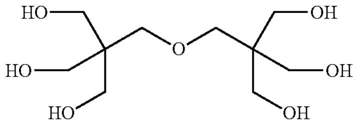

(24)

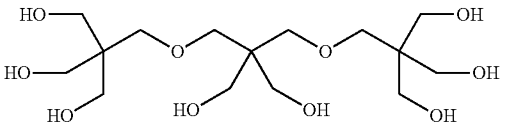

(25)

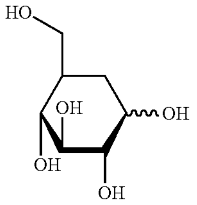

(26)

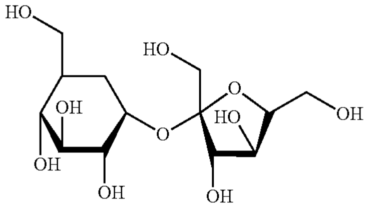

(27)

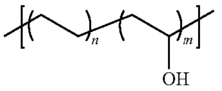

(28)

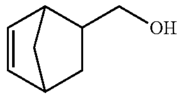

Preferably, the type and amount of the Lewis acid-base pair in the catalytic initiating system can be adjusted according to the activity of the monomer, the designed molecular weight and the required reaction time.

Compared with the prior art, the present invention has the following beneficial effects and advantages.

(1) The present invention provides a method for preparing polyether-polyester block copolymers with controllable sequences. The bidirectional selectivity of the polymerization system to epoxies or cyclic esters is achieved by adjusting the ratio of the acid-base content of organic bases and alkyl boranes in the metal-free Lewis acid-base pair.

(2) Since it is difficult to avoid the transesterification reaction in the epoxy polymerization process, it is difficult to realize the block copolymer structure of polyester first and then polyether. The invention can selectively and efficiently polymerize epoxies in the presence of aliphatic esters, without transesterification and chain transfer reactions, and can prepare ester-ether block copolymers by the one-pot method. The invention breaks through the synthesis strategy of traditional ether-ester block copolymers, which uses epoxies as the first monomers and cyclic esters as the second monomers, and thus the limitations of the single sequence structure and monotonous morphological property of the block copolymers.

(3) The catalysts and the initiators are separated, and the macromolecular polyethers or polyesters are used as the initiators to prepare polyether-polyester block copolymers in one pot and one step; or small molecular hydroxyl groups with different monomer combinations are used to prepare copolymers with various structural characteristics, such as end group functionalization, side group functionalization, block, multi-block, star, graft, etc.

(4) The combination of hydroxyl compounds and two-component catalysts solves the problem of insufficient polymerization activity and controllability, a limited application scope, inflexible catalytic activity adjustment, residual metal, etc. under the existing one-component or two-component organic or organometallic catalytic initiating system.

(5) The high efficiency of the catalytic/initiating system enables the ring-opening polymerization of relatively inert epoxy monomers to be carried out mildly in conventional glass reactors at room temperature, with no or a small amount of solvent (high concentration) and a low catalyst dosage.

(6) The catalytic initiating system provided by the present invention can implement the block copolymerization of various cyclic esters (such as ε-caprolactone and lactide) and ethylene oxide to obtain amphiphilic ester-ether block copolymers with hydrophilic segments outside. Such copolymers form micellar aggregates in water.

(7) The catalytic initiating system provided by the present invention is suitable for a variety of epoxy and cyclic ester monomers to prepare a variety of monomer combinations and block copolymers with rich structures. At the same time, end group and side group functional groups can be kept intact.

(8) A series of ester-ether or ether-ester block copolymers prepared by the present invention are precisely controllable in a wide molecular weight range (1.2-149.2 kg/mol), and the molecular weight dispersion ($Đ_M$) is generally around 1.1, which can be used to prepare high molecular weight copolymers.

DESCRIPTION OF THE EMBODIMENTS

Figure 1:
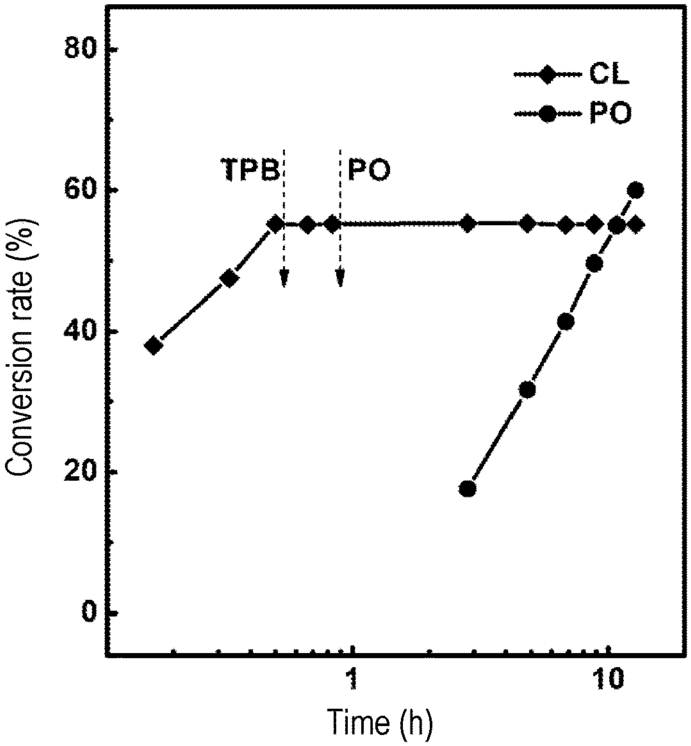
FIG. 1 is a schematic illustration of the conversion rate of CL as a function of reaction time in the ε-caprolactone (CL) and PO continuous ring-opening polymerization process provided in embodiment 6.

The present invention will be further described in detail below with reference to specific embodiments, but the embodiments of the present invention are not limited thereto. All technologies implemented based on the above content of the present invention belong to the scope of the present invention.

The conversion rate of monomers and the structural characteristics of polymers were measured by a Bruker AV400 liquid NMR spectrometer with deuterated chloroform as the solvent.

The molecular weight and molecular weight dispersion of polyethylene oxide are measured by size exclusion chromatography (SEC), and the instruments are a Waters 1515 pump and HR-2, HR-4, HR-6 series chromatographic columns, with N,N-dimethylformamide as the mobile phase, a column temperature of 50° C., and a flow rate of 1 mL/min; a calibration curve was plotted with a series of polyethylene oxide standard samples.

The molecular weight and dispersion of the remaining polymers are measured using an Agilent 1260 Infinity size exclusion chromatograph, with tetrahydrofuran as the mobile phase, a column temperature of 35° C., and a flow rate of 1 mL/min; a calibration curve was plotted with a series of polystyrene standard samples.

Light scattering experiments are performed using an ALV/CGS-3 compact light scattering system (ALVGmbH, Germany) equipped with an ALV-5000/EPP multi-ι digital correlator (288 channels) and an ALV/LSE-5003 stepper motor driver and limit switch controlled light scattering electronics. The light source is a JDS Uniphase 22 mW He—Ne laser generator with a wavelength of 632.8 nm.

Dynamic light scattering (DLS) experiments are carried out over an angular range of 20° to 150° to measure the mean hydrodynamic radius $<R_h>$, the hydrodynamic radius distribution $f(R_h)$ and the dispersion. In static light scattering (SLS) measurements, the weight average molecular weight $M_w$ and the z-mean square radius of rotation $<R_g>$ of the aggregates were obtained by Zimm plot.

The parts described in the formulas in the following embodiments are all molar parts.

Embodiment 1

Using a polycaprolactone diol ($PCL^{8k}2OH$) with a number-average molecular weight of 8,000 as an initiator, and a metal-free Lewis acid-base pair as a catalyst, the ring-opening polymerization of propylene oxide (PO) is carried out, and a PPO-b-PCL-b-PPO triblock copolymer is prepared by a one-pot one-step method. The specific operations are as follows.

$PCL^{8k}2OH$, tetrahydrofuran (THF) and PO are used after purification and water removal. In an inert atmosphere, 1 part of $PCL^{8k}2OH$, 180 parts of PO and an appropriate amount of THF are added to a dry glass reactor and stirred until homogeneous (where $[PO]_0$=6 mol $L^{-1}$). A mixture of 0.1 part of phosphazene base t-$BuP_2$ and 0.5 part of triisopropylborane (TPB) is added to a reaction flask, and stirred at room temperature for 12 h. The reaction is terminated with acetic acid, and the crude product is collected, precipitated and dried. The molecular weight and dispersion of the crude product measured by SEC are 22.3 kg/mol and 1.12. The PO conversion rate measured by $^1H$ NMR is 100%. The theoretical number-average molecular weights $M_{n,th}$(PPO) and $M_{n,th}$(PPO-b-PCL-b-PPO triblock copolymer) calculated from the feed ratio and conversion rates of $PCL^{8k}2OH$ and PO are 2×5.2 kg/mol and 18.5 kg/mol. The molar ratio of hydroxyl-terminated polyesters, organic bases and alkyl boranes in the catalytic initiating system described in this embodiment is 1:0.1:0.5.

Embodiments 1 to 5 start from the macromolecular initiator of a hydroxyl-terminated polyester or hydroxyl-terminated polyether, and the general formula of the reaction structure of the polyether-polyester block copolymer obtained in one pot and one step is as follows:

One-pot one-step method

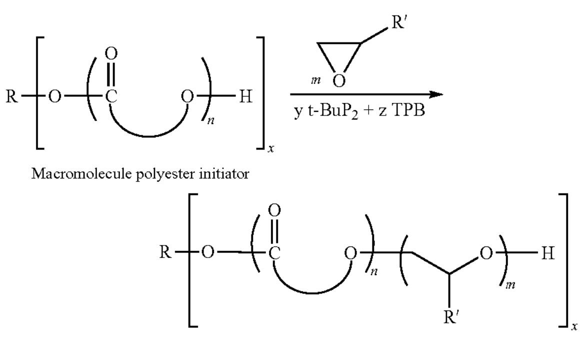

x = 1, 2, 3, 4 . . .
0.01 < y < 1, 0.01 < z < 10

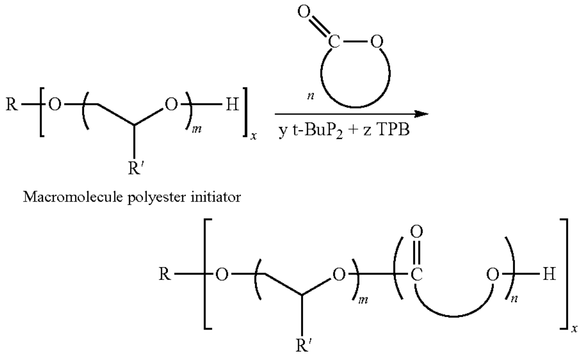

x = 1, 2, 3, 4 . . .
0.01< y < 1, 0.01 < z < 1

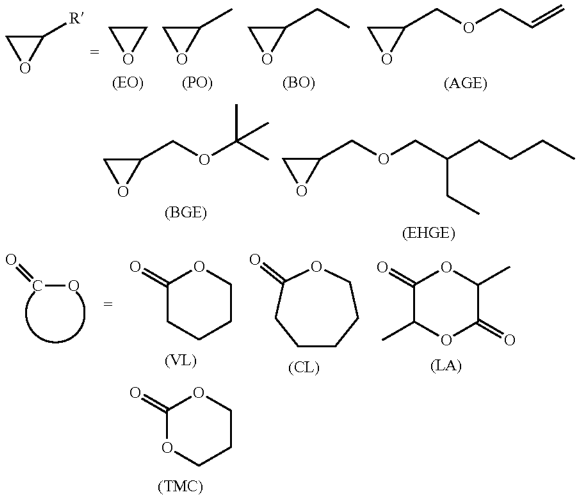

(EO) (PO) (BO) (AGE) (BGE) (EHGE) (VL) (CL) (LA) (TMC)

-continued

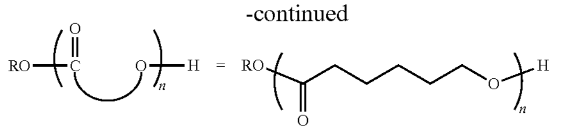

Polycaprolactone

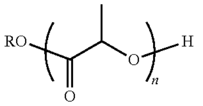

Polypropiolactone

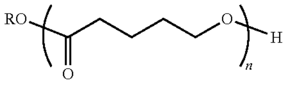

Polyvalerolactone

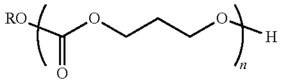

Polytrimethylene carbonate

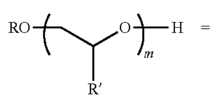

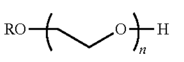

Polyethylene oxide

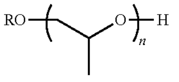

Polypropylene oxide

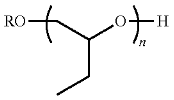

Polybutylene oxide

Embodiment 2

Using a polycaprolactone tetraol ($PCL^{10K}4OH$) with a number-average molecular weight of 10,000 as an initiator, and a metal-free Lewis acid-base pair as a catalyst, the ring-opening polymerization of ethylene oxide (EO) is carried out, and a four-arm PCL-b-PEO copolymer is prepared by a one-pot one-step method. The specific operations are as follows.

$PCL^{10K}4OH$, THF and EO are all used after purification and water removal. In an inert atmosphere, 1 part of $PCL^{10K}4OH$ and an appropriate amount of THF are added to a dry glass reactor and stirred until homogeneous. A mixture of 0.1 part of phosphazene base t-$BuP_2$ and 0.5 part of TPB is added, the glass reactor is connected to a vacuum line, part of the gas in the reactor is removed, and an ice-water bath is used to cool down. 300 parts of dry EO (where $[EO]_0$=9.0 mol $L^{-1}$) are added at −20° C., and react in a sealed glass reactor for 5 h at room temperature. After the reaction is completed, the reactor is opened, and the crude product is collected, precipitated and dried. The molecular weight and dispersion of the crude product measured by SEC are 28.5 kg/mol and 1.15. The EO conversion rate measured by $^1H$ NMR is 100%. The theoretical number-average molecular weights $M_{n,th}$(PEO) and $M_{n,th}$(four-arm PCL-b-PEO copolymer) calculated from the feed ratio and conversion rates of $PCL^{10K}4OH$ and EO are 4×3.3 kg/mol and 23.2 kg/mol. The molar ratio of hydroxyl-terminated polyesters, organic bases and alkyl boranes in the catalytic initiating system described in this embodiment is 1:0.1:0.5.

Embodiment 3

Using a polylactide diol ($PLA^{8K}2OH$) with a number-average molecular weight of 8,000 as an initiator, and a metal-free Lewis acid-base pair as a catalyst, the ring-opening polymerization of EO is carried out, and a PEO-b-PLA-b-PEO triblock copolymer is prepared by a one-pot one-step method. The specific operations are as follows.

$PLA^{8K}2OH$, THF and EO are used after purification and water removal. In an inert atmosphere, 1 part of $PLA^{8K}2OH$ and solvent are added to a dry glass reactor and stirred until homogeneous. A mixture of 0.1 part of phosphazene base t-$BuP_2$ and 0.5 part of TPB is added, the glass reactor is connected to a vacuum line, part of the gas in the reactor is removed, and an ice-water bath is used to cool down. 230 parts of dry EO (where $[EO]_0$=4.0 mol $L^{-1}$) are added at −20° C., and react in a sealed glass reactor for 7 h at room temperature. After the reaction is completed, the reactor is opened, and the crude product is collected, precipitated and dried. The molecular weight and dispersion of the crude product measured by SEC are 18.2 kg/mol and 1.12. The EO conversion rate measured by $^1H$ NMR is 100%. The theoretical number-average molecular weights $M_{n,th}$(PEO) and $M_{n,th}$(PEO-b-PLA-b-PEO triblock copolymer) calculated from the feed ratio and conversion rates of $PLA^{8K}2OH$ and EO are 2×5.1 kg/mol and 15.1 kg/mol. The molar ratio of hydroxyl-terminated polyesters, organic bases and alkyl boranes in the catalytic initiating system described in this embodiment is 1:0.1:0.5.

Embodiment 4

Using a polyethylene oxide monomethyl ether ($PEO^{0.2K}$) with a number-average molecular weight of 200 as an initiator, and a metal-free Lewis base as a catalyst, the ring-opening polymerization of CL is carried out, and a PEO-b-PCL diblock copolymer is prepared by a one-pot one-step method. The specific operations are as follows.

$PEO^{0.2K}$, THF and CL are all used after purification and water removal. In an inert atmosphere, 1 part of $PEO^{0.2K}$, 18 parts of CL and an appropriate amount of THF are added to a dry glass reactor and stirred until homogeneous (where $[CL]_0$=4.0 mol $L^{-1}$). 0.05 part of phosphazene base t-$BuP_2$ is added to the reaction flask, and stirred at room temperature for 5 h. The reaction is terminated with acetic acid, and the crude product is collected, precipitated and dried. The molecular weight and dispersion of the crude product measured by SEC are 1.6 kg/mol and 1.05. The CL conversion rate measured by $^1H$ NMR is 50%. The theoretical number-average molecular weights $M_{n,th}$(PCL) and $M_{n,th}$(PEO-b-PLA diblock copolymer) calculated from the feed ratio and conversion rates of $PEO^{0.2K}$ and CL are 1.0 kg/mol and 1.2 kg/mol. The molar ratio of hydroxyl-terminated polyethers and organic bases in the catalytic initiating system described in this embodiment is 1:0.05.

Embodiment 5

Using a polyethylene oxide monomethyl ether ($PEO^{5K}$) with a number-average molecular weight of 5,000 as an initiator, and a metal-free Lewis acid-base pair as a catalyst, the ring-opening polymerization of rac-lactide (LA) is carried out, and a PEO-b-PLA diblock copolymer is prepared by a one-pot one-step method. The specific operations are as follows $PEO^{5K}$, THF and LA are used after purification and water removal. In an inert atmosphere, 1 part of $PEO^{5K}$, 40 parts of LA and an appropriate amount of THF are added to a dry glass reactor and stirred until homogeneous (where $[LA]_0$=1.0 mol $L^{-1}$). 0.1 part of phosphazene base t-$BuP_2$ and 0.05 part of TPB are added to the reaction flask, and stirred at room temperature for 2 h. The reaction is terminated with acetic acid, and the crude product is collected, precipitated and dried. The molecular weight and dispersion of the crude product measured by SEC are 11.3 kg/mol and 1.11. The LA conversion rate measured by $^1$H NMR is 90%. The theoretical number-average molecular weights $M_{n,th}$(PLA) and $M_{n,th}$(PEO-b-PLA diblock copolymer) calculated from the feed ratio and conversion rates of $PEO^{5K}$ and LA are 5.2 kg/mol and 10.2 kg/mol. The molar ratio of hydroxyl-terminated polyethers, organic bases and alkyl boranes in the catalytic initiating system described in this embodiment is 1:0.1:0.05.

Embodiment 6

Stepwise adding monomers, using a small-molecular diol as an initiator, and a metal-free Lewis acid-base pair as a catalyst, the continuous ring-opening polymerization of ε-caprolactone (CL) and PO is carried out, and a PPO-b-PCL-b-PPO triblock ester-ether copolymer is prepared by a one-pot method. The specific operations are as follows.

Terephthalic alcohol (BDM), toluene, CL and PO are all used after water removal. In an inert atmosphere, 1 part of BDM and 200 parts of CL are added to a dry glass reactor, and stirred and mixed well (where $[CL]_0$=8.5 mol $L^{-1}$). 0.1 part of phosphazene base t-$BuP_2$ is added, and stirred at room temperature for 0.7 h. Then 0.3 parts of TPB, toluene and 300 parts of PO (where $[PO]_0$=6.3 mol $L^{-1}$) are sequentially added, and the reaction is continued for 18 h. In this embodiment, t-$BuP_2$ is used to catalyze the polymerization of CL in the first step; TPB and t-$BuP_2$ are added to form a Lewis acid-base pair to catalyze the polymerization of PO in the second step. At the end of the reaction, the reactants in the glass reactor are very viscous until cured. The reactor is opened, the crude product is collected, precipitated and dried.

Figure 2:
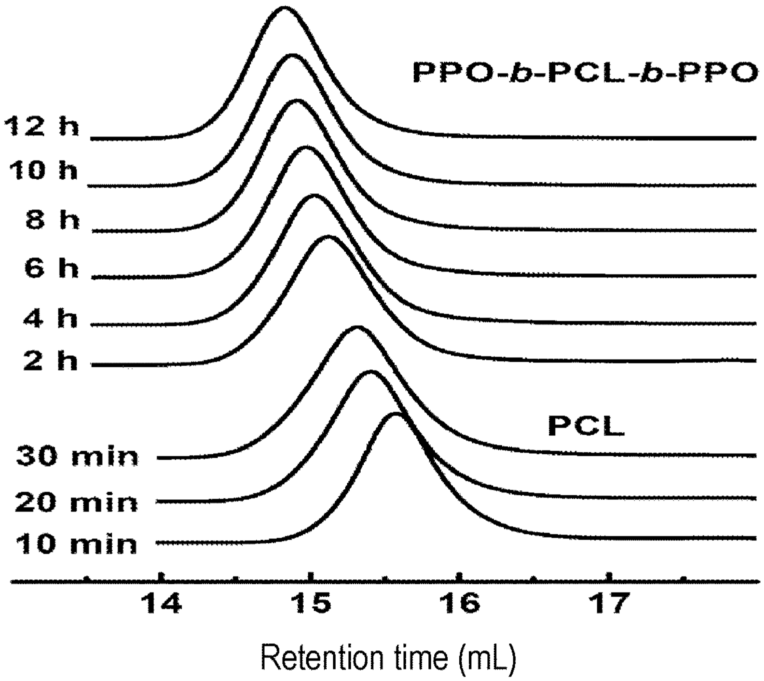
FIG. 2 is an SEC curve of the ε-caprolactone (CL) and PO continuous ring-opening polymerization process provided in embodiment 6.
Figure 3:
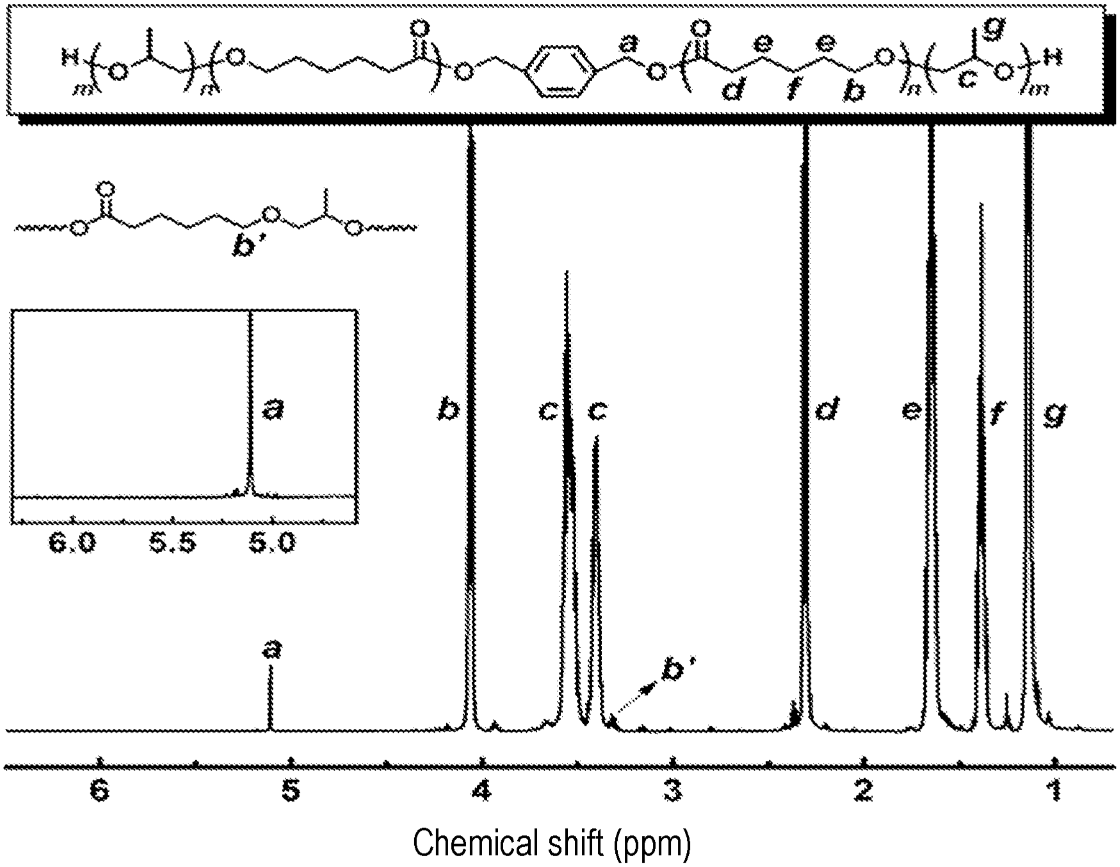
FIG. 3 is a $^1H$ NMR spectrum of the PPO-b-PCL-b-PPO block copolymer produced by the polymerization in embodiment 6.

The sampling of the polymerization process is monitored. As shown in FIG. 1, PCL generated in the first step is initiated by BDM, and the CL conversion rate gradually increases with the extension of the reaction time. After adding alkyl boranes, CL is no longer consumed, i.e. the molecular weight of PCL no longer increases, and the GPC curve no longer changes. After adding PO at this time, PPO begins to grow, while the conversion rate of CL remains unchanged during the polymerization of PPO. Combined with the SEC curve (FIG. 2), the results show that PCL generated in the first step all acts as the macroinitiator of the second-step PPO polymerization. Throughout the reaction, the SEC curve consistently appears as a single peak with a very narrow dispersion (<1.15), with an overall forward shift. The molecular weight and dispersion of the crude product measured by SEC are 31.2 kg/mol and 1.12. The CL and PO conversion rates measured by $^1$H NMR are 62% and 81%. The theoretical number-average molecular weights $M_{n,th}$(PCL), $M_{n,th}$(PPO) and $M_{n,th}$(PPO-b-PCL-b-PPO triblock ester-ether copolymer) calculated from the feed ratio and conversion rates of CL, PO and BDM are 14.2 kg/mol, 2×7.1 kg/mol and 28.4 kg/mol. $^1$H NMR (FIG. 3) indicates that well-defined PPO-b-PCL-b-PPO block copolymers are obtained. In the catalytic initiating system described in this embodiment, the molar ratio of hydroxyl compounds and organic bases before catalytic conversion is 1:0.1; the molar ratio of hydroxyl compounds, organic bases and alkyl boranes after catalytic conversion is 1:0.1:0.3.

It can be seen from the $^1$H NMR spectrum (FIG. 3) that all the small-molecule hydroxyl compounds BDM participate in initiating CL polymerization to form polyesters, and polyesters can be regarded as macromolecular hydroxyl compounds in this system, so the molar amount of hydroxyl compounds before and after catalytic conversion is unchanged. In the following embodiments, it is considered that the molar amount of hydroxyl compounds is unchanged before and after catalytic conversion.

At room temperature, phosphazene base t-$BuP_2$ can effectively catalyze the ring-opening polymerization of CL, but its alkalinity is not enough to open PO, so it cannot effectively catalyze the block copolymerization of CL and PO when used alone. In this embodiment, in the presence of t-$BuP_2$, a small amount of alkyl boranes can be added to grow PPO from PCL under mild reaction conditions (room temperature, low alkalinity), while the highly reactive ester structure (including PCL and incompletely reacted CL in the first step) is completely unaffected. Therefore, in this embodiment, a weakly basic organic base and an alkyl borane are formed into a Lewis acid-base pair to selectively polymerize epoxies in an ester environment, thereby providing an efficient and controllable reverse polymerization method of epoxy and cyclic ester monomers. Compared with the existing catalytic system, the catalyst of the method has rapid and sensitive in-situ activity conversion, high monomer selectivity, wide application, mild polymerization conditions, and strict block copolymers can be obtained without complete conversion of the first monomers, which is the first known method to realize the controllable and efficient copolymerization of reverse ether-ester block copolymers. Embodiments 6-21 start from small-molecule hydroxyl compounds, and the general formula of the reaction structure of polyester-b-polyether obtained in one pot and two steps is as follows:

Stepwise addition of monomers, one-pot two-step method to prepare polyether-b-polyester

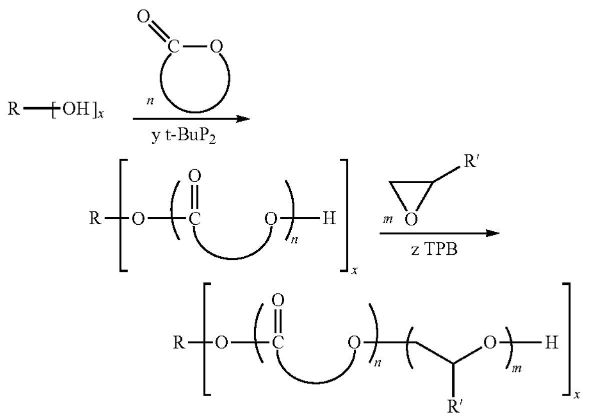

x = 1, 2, 3, 4 . . .
0.01 < y < 1, 0.01 < z < 10

Simultaneous addition of monomers, one-pot two-step method to prepare polyether-b-polyester

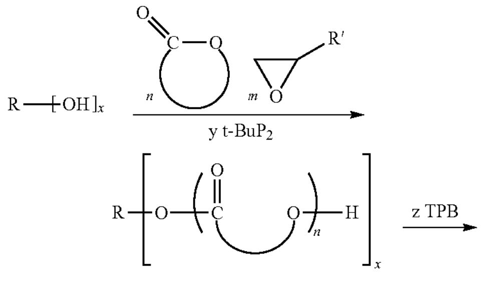

-continued

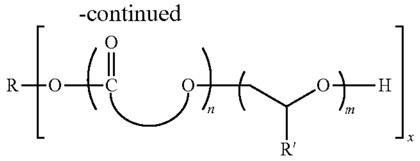

x = 1, 2, 3, 4 . . .

$0.01 < y < 1$, $0.01 < z < 10$

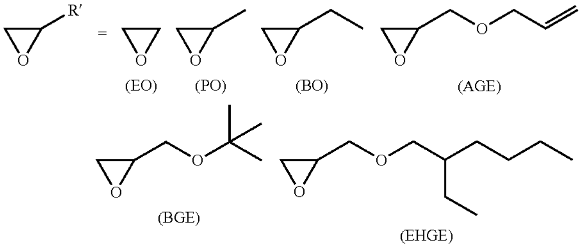

(EO) (PO) (BO) (AGE)

(BGE) (EHGE)

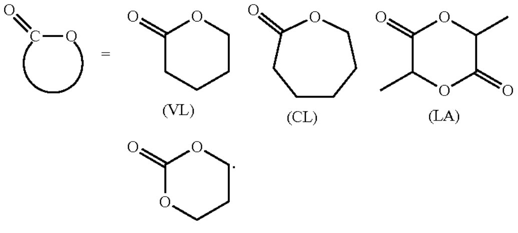

(VL) (CL) (LA)

(TMC)

Embodiment 7

Stepwise adding monomers, using a small molecular diol as an initiator, and a metal-free Lewis acid-base pair as a catalyst, the continuous ring-opening polymerization of CL and EO is carried out, and an amphiphilic PEO-b-PCL-b-PEO ester-ether block copolymer is prepared by a one-pot method. The specific operations are as follows.

BDM, CL and EO are used after water removal. In an inert atmosphere, 1 part of BDM and 200 parts of CL are added to a dry glass reactor, and stirred and mixed well (where $[CL]_0$=8.5 mol $L^{-1}$). 0.1 part of phosphazene base t-$BuP_2$ is added, and stirred at room temperature for 0.7 h, and then 0.2 part of TPB is added. The glass reactor is connected to a vacuum line, part of the gas in the reactor is removed, and an ice-water bath is used to cool down. 300 parts of dry EO (where $[EO]_0$=12.0 mol $L^{-1}$) are added at −20° C., and react in a sealed glass reactor for 3 h at room temperature. After the reaction is completed, the reactor is opened, and the crude product is collected, precipitated and dried. The molecular weight and dispersion of the crude product measured by SEC are 29.3 kg/mol and 1.13. The conversion rates of CL and EO measured by $^1$H NMR are 62% and 100%. The theoretical number-average molecular weights $M_{n,th}$(PCL), $M_{n,th}$(PEO) and $M_{n,th}$(PEO-b-PCL-b-PEO ester-ether block copolymer) calculated from the feed ratio and conversion rates of CL, EO and BDM are 14.2 kg/mol, 2×6.6 kg/mol and 27.4 kg/mol. In this embodiment, the molar ratio of hydroxyl compounds and organic bases before catalytic conversion is 1:0.1; the molar ratio of hydroxyl compounds, organic bases and alkyl boranes after catalytic conversion is 1:0.1:0.2.

The content $W_{PEO}$ of the hydrophilic block PEO in the amphiphilic PEO-b-PCL-b-PEO ester-ether block copolymer prepared in this embodiment is 48%. The product can be dissolved in water by heating at 60° C. for 30 min to form a 10 mg/mL bluish homogeneous aqueous solution.

Embodiment 8

Stepwise adding monomers, using a small molecular tetraol as an initiator, and a metal-free Lewis acid-base pair as a catalyst, the continuous ring-opening polymerization of CL and EO is carried out, and an amphiphilic four-arm PCL-b-PEO ester-ether block copolymer is prepared by a one-pot method. The specific operations are as follows.

On the basis of embodiment 7, the hydroxyl compound is replaced with pentaerythritol. In the first step, an appropriate amount of THF and 1 part of pentaerythritol are first added, and the reaction flask is heated to 60° C. and refluxed for 40 min to dissolve pentaerythritol. After the reaction flask is cooled, 200 parts of CL (where $[CL]_0$=3.4 mol $L^{-1}$) and 0.5 part of phosphazene base t-$BuP_2$ are sequentially added, and the reaction was carried out at room temperature for 15 h. 1.5 parts of TPB are added for catalytic conversion, 300 parts of EO are steamed into the reaction flask (where $[EO]_0$=4.0 mol $L^{-1}$, the steaming operation is the same as in embodiment 7), and the reaction is continued for 3 h. After the reaction is completed, the crude product is collected, precipitated and dried. The molecular weight and dispersion of the crude product measured by SEC are 28.3 kg/mol and 1.11. The conversion rates of CL and EO measured by $^1$H NMR are 59% and 100%. The theoretical number-average molecular weights $M_{n,th}$(PCL), $M_{n,th}$(PEO) and $M_{n,th}$(PCL-b-PEO ester-ether block copolymer) calculated from the feed ratio and conversion rates of CL, EO and pentaerythritol are 4×3.4 kg/mol, 4×3.3 kg/mol and 26.8 kg/mol. $^1$H NMR results show that the polymers are well-defined four-arm star PCL-b-PEO copolymers. In this embodiment, the molar ratio of hydroxyl compounds and organic bases before catalytic conversion is 1:0.5; the molar ratio of hydroxyl compounds, organic bases and alkyl boranes after catalytic conversion is 1:0.5:1.5.

Amphiphilic block copolymers can spontaneously form spherical, rod-like, vesicle-like, hollow, tubular, fibrous, and other polymer micelles in selective solvents. This self-assembly behavior of polymers is similar to that of low molecular weight surfactants (LMWS) to form micelles, which is beneficial for dissolving hydrophobic or lipid-soluble molecules, but polymer micelles have higher stability than LMWS micelles and can encapsulate more guest molecules in cores. Therefore, in the field of biomedicine, polymer micelles are often used as carriers to deliver drugs, proteins, diagnostic reagents, genes, etc. Compared with linear polymers with similar molecular weights and components, star polymers have special properties such as small hydrodynamic volumes, regular structures, low intrinsic viscosity, and dense functional groups, so the self-assembled micelles formed by them will show more interesting properties. The content $W_{PEO}$ of the hydrophilic block polyethylene oxide in the amphiphilic four-arm polycaprolactone-polyethylene oxide prepared in this embodiment is 49%. The product can be dissolved in water by heating at 60° C. for 30 min to form a 10 mg/mL bluish homogeneous aqueous solution. DLS and SLS analysis shows that copolymer molecules form regular micellar aggregates in water, with a root-mean-square radius of rotation $R_g$ of 12.6 nm and a narrow dispersion, and a hydrodynamic radius $R_h$ of 16.4 nm, showing a unimodal distribution.

Embodiment 9

Stepwise adding monomers, using a functionalized small molecular monoalcohol as an initiator, and a metal-free Lewis acid-base pair as a catalyst, the continuous ring-opening polymerization of CL and EO is carried out, and an end-functionalized amphiphilic PCL-b-PEO diblock ester-ether copolymer is prepared by a one-pot method. The specific operations are as follows.

The hydroxyl compound is replaced with 5-norbornene-2-methanol, the mole fraction of the hydroxyl compound is kept unchanged, the mole fractions of CL and EO added are changed to 80 and 100, respectively, and the others are the same as in embodiment 7. The molecular weight and dispersion of the crude product measured by SEC are 10.5 kg/mol and 1.12. The conversion rates of CL and EO measured by $^1$H NMR are 55% and 100%. The theoretical number-average molecular weights $M_{n,th}$(PCL), $M_{n,th}$(PEO) and $M_{n,th}$(PCL-b-PEO diblock ester-ether copolymer) calculated from the feed ratio and conversion rates of CL, EO and 5-norbornene-2-methanol are 5.0 kg/mol, 4.4 kg/mol and 9.4 kg/mol. $^1$H NMR results show that the polymers are all initiated by 5-norbornene-2-methanol, and the end-group functionalization structure is clear.

In the three-component catalytic initiating system used in the present invention, the catalyst and the initiator are separated, and each is a separate component, which is convenient to use different initiators to prepare copolymers with various structural characteristics such as end-group functionalization, star, grafting, etc. Neutral metal-free Lewis acid-base pairs and mild reaction conditions can ensure that the functional group structure of the functionalized initiator is maintained during the polymerization process, providing the possibility for further post-modification.

Embodiment 10

The amount of the hydroxyl compound is kept unchanged, the amount of the added phosphazene base t-Bu$P_2$ is changed to 0.01 part, the amount of TPB is changed to 0.02 part, and the others are the same as in embodiment 9. The molecular weight and dispersion of the crude product measured by SEC are 8.2 kg/mol and 1.11. The conversion rates of CL and EO measured by $^1$H NMR are 43% and 82%. The theoretical number-average molecular weights $M_{n,th}$(PCL), $M_{n,th}$(PEO) and $M_{n,th}$(PCL-b-PEO diblock ester-ether copolymer) calculated from the feed ratio and conversion rates of CL, EO and 5-norbornene-2-methanol are 4.0 kg/mol, 2.9 kg/mol and 6.9 kg/mol. In this embodiment, the molar ratio of hydroxyl compounds and organic bases before catalytic conversion is 1:0.01; the molar ratio of hydroxyl compounds, organic bases and alkyl boranes after catalytic conversion is 1:0.01:0.02.

Embodiment 11

Stepwise adding monomers, using a small molecular diol as an initiator, and a metal-free Lewis acid-base pair as a catalyst, the continuous ring-opening polymerization of LA and EO is carried out, and a PEO-b-PLA-b-PEO triblock ester-ether copolymer is prepared by a one-pot method. The specific operations are as follows.

1,4-butanediol (BDO), LA and EO are all used after water removal. In an inert atmosphere, 1 part of BDO, 80 parts of LA and an appropriate amount of THF are added to a dry glass reactor, and stirred and mixed well (where $[LA]_0$=1.1 mol $L^{-1}$). 0.1 part of phosphazene base t-Bu$P_2$ is added and stirred at room temperature for 1 h, and then 1 part of TPB is added. The glass reactor is connected to a vacuum line, part of the gas in the reactor is removed, and an ice-water bath is used to cool down. 200 parts of dry EO (where [EO]0=4.2 mol L−1) are added at −20° C., and react in a sealed glass reactor for 5 h at room temperature. After the reaction is completed, the reactor is opened, and the crude product is collected, precipitated and dried. The molecular weight and dispersion of the crude product measured by SEC are 19.2 kg/mol and 1.11. The conversion rates of LA and EO measured by $^1$H NMR are 88% and 100%. The theoretical number-average molecular weights $M_{n,th}$(PLA), $M_{n,th}$(PEO) and $M_{n,th}$(PEO-b-PLA-b-PEO ester-ether block copolymer) calculated from the feed ratio and conversion rates of LA, EO and BDO are 10.1 kg/mol, 2×4.4 kg/mol and 18.9 kg/mol. $^1$H NMR results show that the polymers are well-defined PEO-b-PLA-b-PEO triblock copolymers. In this embodiment, the molar ratio of hydroxyl compounds and organic bases before catalytic conversion is 1:0.1; the molar ratio of hydroxyl compounds, organic bases and alkyl boranes after catalytic conversion is 1:0.1:1.

Embodiment 12

Stepwise adding monomers, using a small molecular diol as an initiator, and a metal-free Lewis acid-base pair as a catalyst, the continuous ring-opening polymerization of trimethylene carbonate (TMC) and PO is carried out, and a PPO-b-PTMC-b-PPO triblock ester-ether copolymer is prepared by a one-pot method. The specific operations are as follows.

BDO, TMC and PO are all used after water removal. In an inert atmosphere, 1 part of BDO, 80 parts of TMC and an appropriate amount of THF are added to a dry glass reactor, and stirred and mixed well (where $[TMC]_0$=3.0 mol $L^{-1}$). 0.1 part of phosphazene base t-Bu$P_2$ is added and stirred at room temperature for 0.2 h. Then 0.5 parts of TPB and 200 parts of PO (where $[PO]_0$=4.2 mol $L^{-1}$) are sequentially added, and the reaction is continued for 20 h. After the reaction is completed, the reactor is opened, and the crude product is collected, precipitated and dried. The molecular weight and dispersion of the crude product measured by SEC are 18.6 kg/mol and 1.11. The conversion rates of TMC and PO measured by $^1$H NMR are 94% and 72%. The theoretical number-average molecular weights $M_{n,th}$(PTMC), $M_{n,th}$(PPO) and $M_{n,th}$(PPO-b-PTMC-b-PPO ester-ether block copolymer) calculated from the feed ratio and conversion rates of TMC, PO and BDO are 7.7 kg/mol, 2×4.2 kg/mol and 16.1 kg/mol. $^1$H NMR results show that the polymers are well-defined PPO-b-PTMC-b-PPO triblock copolymers. In this embodiment, the molar ratio of hydroxyl compounds and organic bases before catalytic conversion is 1:0.1; the molar ratio of hydroxyl compounds, organic bases and alkyl boranes after catalytic conversion is 1:0.1:0.5.

Using the three-component catalytic initiating system provided by the present invention, the ring-opening polymerization of epoxy monomer is carried out in the presence of esters, and the catalytic efficiency is also affected by the feed ratio of alkyl boranes and organic bases. According to the test results of $^{11}$B NMR, there is no obvious interaction between neutral organic bases and alkyl boranes, they are independent of each other, and the feed ratio can be adjusted arbitrarily. For example, at a low monomer reaction concentration, embodiments 11 and 12 increase the polymerization rate of epoxies by increasing the amount of alkyl boranes. Therefore, the present invention also provides a method for simply and flexibly adjusting the polymerization efficiency according to the actual demand by utilizing the feed ratio of the Lewis acid-base pair.

Embodiment 13

The amount of the initiator BDO is reduced to 0.1 part, and the others are the same as in embodiment 12. The molecular weight and dispersion of the crude product measured by SEC are 137.1 kg/mol and 1.14. The conversion rates of TMC and PO measured by $^1$H NMR are 86% and 68%. The theoretical number-average molecular weights $M_{n,th}$(PTMC), $M_{n,th}$(PPO) and $M_{n,th}$(PPO-b-PTMC-b-PPO ester-ether block copolymer) calculated from the feed ratio and conversion rates of TMC, PO and BDO are 70.2 kg/mol, 2×39.5 kg/mol and 149.2 kg/mol. In this embodiment, the molar ratio of hydroxyl compounds and organic bases before catalytic conversion is 1:1; the molar ratio of hydroxyl compounds, organic bases and alkyl boranes after catalytic conversion is 1:1:5.

Embodiment 14

The organic base is replaced with 2-tert-butylimino-2-diethylamino-1,3-dimethylperhydro-1,3,2-diazaphosphorus (BEMP), in the first step, TMC reacts for 1 h, in the second step, PO reacts for 30 h, and the others are the same as in embodiment 12. The molecular weight and dispersion of the crude product measured by SEC are 15.9 kg/mol and 1.11. The conversion rates of TMC and PO measured by $^1$H NMR are 83% and 78%. The theoretical number-average molecular weights $M_{n,th}$(PTMC), $M_{n,th}$(PPO) and $M_{n,th}$(PPO-b-PTMC-b-PPO ester-ether block copolymer) are 6.8 kg/mol, 2×4.5 kg/mol and 15.8 kg/mol.

Embodiment 15

The organic base is replaced with 7-methyl-1,5,7-triazabicyclo[4.4.0]dec-5-ene (MTBD). In the first step, TMC reacts for 1 h, in the second step, PO reacts for 30 h, and the others are the same as in embodiment 12. The molecular weight and dispersion of the crude product measured by SEC are 15.8 kg/mol and 1.11. The conversion rates of TMC and PO measured by $^1$H NMR are 80% and 76%. The theoretical number-average molecular weights $M_{n,th}$(PTMC), $M_{n,th}$(PPO) and $M_{n,th}$(PPO-b-PTMC-b-PPO ester-ether block copolymer) are 6.5 kg/mol, 2×4.4 kg/mol and 15.3 kg/mol.

Embodiment 16

The alkyl borane is replaced with tributyl boron, and the others are the same as in embodiment 12. The molecular weight and dispersion of the crude product measured by SEC are 17.3 kg/mol and 1.12. The conversion rates of TMC and PO measured by $^1$H NMR are 94% and 75%. The theoretical number-average molecular weights $M_{n,th}$(PTMC), $M_{n,th}$(PPO) and $M_{n,th}$(PPO-b-PTMC-b-PPO ester-ether block copolymer) are 7.7 kg/mol, 2×4.4 kg/mol and 16.5 kg/mol.

It is difficult for conventional polyether polyester synthesis systems to avoid the interference of chain transfer reactions (to monomers, solvents) and transesterification reactions (in the presence of esters) during polyether polymerization, so ester-ether block copolymers with regular structures and controllable molecular weights cannot be obtained. The three-component catalytic initiating system constructed by small molecular alcohols, organic bases and alkyl boranes can selectively polymerize epoxies from mixed monomers to obtain copolymers with controllable molecular weights, low dispersion and well-defined structures, and completely eliminates the occurrence of side reactions (chain transfer and transesterification), indicating that the polymerization reaction has active characteristics. By reducing the amount of the initiator, ester-ether block copolymers with molecular weights up to 149.2 kg/mol can be prepared.

We also explored the catalytic activity of Lewis acid-base pairs composed of other commonly used neutral organic bases (such as BEMP, MTBD, etc.) and alkyl boranes. The results show that the catalytic efficiency of Lewis acid-base pairs is affected by the alkalinity of organic bases and the acidity of alkyl boranes, and also has a certain relationship with the molecular size of the catalyst, i.e. the steric-hindrance effect.

Embodiment 17

The solvent is replaced with cyclohexane, and the others are the same as in embodiment 6. The molecular weight and dispersion of the crude product measured by SEC are 30.8 kg/mol and 1.12. The conversion rates of CL and PO measured by $^1$H NMR are 61% and 78%. The theoretical number-average molecular weights $M_{n,th}$(PCL), $M_{n,th}$(PPO) and $M_{n,th}$(PPO-b-PCL-b-PPO triblock ester-ether copolymer) are 13.9 kg/mol, 2×6.8 kg/mol and 27.5 kg/mol.

Embodiment 18

The solvent is replaced with acetone, and the others are the same as in embodiment 6. The molecular weight and dispersion of the crude product measured by SEC are 30.1 kg/mol and 1.11. The conversion rates of CL and PO measured by $^1$H NMR are 59% and 70%. The theoretical number-average molecular weights $M_{n,th}$(PCL), $M_{n,th}$(PPO) and $M_{n,th}$(PPO-b-PCL-b-PPO triblock ester-ether copolymer) are 13.5 kg/mol, 2×6.1 kg/mol and 25.7 kg/mol.

Compared with embodiment 6, the selected cyclohexane and acetone in embodiment 17 and embodiment 18 do not change the polymerization rate much. Due to the presence of a certain amount of esters (cyclic esters as well as linear polyesters) during the second-step PO polymerization, the effect of esters on the polymerization may be greater than that of the solvent. SEC and $^1$H NMR results indicate that no chain transfer reaction to the solvent (e.g. removal of carbonyl a hydrogen) occurs during the polymerization.

Embodiment 19

Simultaneously adding monomers, using a small molecular diol as an initiator, and a metal-free Lewis acid-base pair as a catalyst, the continuous copolymerization of δ-valerolactone (VL) and PO is carried out, and a PPO-b-PVL-b-PPO triblock ester-ether copolymer is prepared. The specific operations are as follows.

BDM, toluene, VL and PO are used after water removal. In an inert atmosphere, 1 part of BDM, 150 parts of VL and 200 parts of PO are added to a dry glass reactor, and stirred and mixed well (where $[VL]_0$=5.0 mol $L^{-1}$). 0.1 part of phosphazene base t-$BuP_2$ is added and stirred at room temperature for 0.5 h. Then 0.3 parts of TPB and toluene are added in sequence (after adding toluene, $[PO]_0$=5.0 mol $L^{-1}$), and the reaction is continued for 18 h. When the reactant in the glass reactor is very viscous until solidified, the reactor is opened, and the crude product is collected, precipitated and dried. The molecular weight and dispersion of the crude product measured by SEC are 26.1 kg/mol and 1.09. The conversion rates of VL and PO measured by $^1$H NMR are 94% and 85%. The theoretical number-average molecular weights $M_{n,th}$(PVL), $M_{n,th}$(PPO) and $M_{n,th}$(PPO-b-PVL-b-PPO triblock ester-ether copolymer) are 14.1 kg/mol, 2×5.0 kg/mol and 24.1 kg/mol. In this embodiment, the molar ratio of hydroxyl compounds and organic bases before catalytic conversion is 1:0.1; the molar ratio of hydroxyl compounds, organic bases and alkyl boranes after catalytic conversion is 1:0.1:0.3.

The reaction system is monitored by $^1$H NMR, and it is found that only PVL is formed before the addition of alkyl boranes, and PO does not participate in the reaction; after the addition of alkyl boranes, the conversion rate of VL does not change, and PPO begins to grow from the PVL end group. This result indicates that the system selectively polymerizes VL in the first step, and selectively polymerizes PO in the second step, and the change of selectivity is regulated by adding alkyl boranes. On the other hand, VL completely loses its polymerization activity after the initial polymerization of PO, and $^1$H NMR shows that the product is a strict block copolymer rather than a gradient structure, indicating that the switch of selectivity is very rapid and sensitive.

Embodiment 20

The amount of the hydroxyl compound is kept unchanged, the amount of the added phosphazene base t-Bu$P_2$ is changed to 1 part, the amount of TPB is changed to 10 parts, in the first step, VL reacts for 10 min, in the second step, PO reacts for 8 h, and the others are the same as in embodiment 19. The molecular weight and dispersion of the crude product measured by SEC are 27.4 kg/mol and 1.15. The conversion rates of VL and PO measured by $^1$H NMR are 98% and 96%. The theoretical number-average molecular weights $M_{n,th}$(PVL), $M_{n,th}$(PPO) and $M_{n,th}$(PPO-b-PVL-b-PPO triblock ester-ether copolymer) are 14.7 kg/mol, 2×5.6 kg/mol and 25.9 kg/mol. In this embodiment, the molar ratio of hydroxyl compounds and organic bases before catalytic conversion is 1:1; the molar ratio of hydroxyl compounds, organic bases and alkyl boranes after catalytic conversion is 1:1:10.

Embodiment 21

Simultaneously adding monomers, using a small molecular monoalcohol as an initiator, and a metal-free Lewis acid-base pair as a catalyst, the continuous copolymerization of VL and butylene oxide (BO) is carried out, and a PVL-b-PBO diblock ester-ether copolymer is prepared. The specific operations are as follows.

Benzyl alcohol, VL and BO are all used after water removal. In an inert atmosphere, 1 part of benzyl alcohol, 150 parts of VL and 200 parts of BO are added to a dry glass reactor, and stirred and mixed well (where $[VL]_0$=5.0 mol $L^{-1}$, $[BO]_0$=6.0 mol $L^{-1}$). 0.1 part of phosphazene base t-Bu$P_2$ is added and stirred at room temperature for 1 h. Then 0.3 part of TPB is added, and the reaction is continued for 24 h. The molecular weight and dispersion of the crude product measured by SEC are 24.8 kg/mol and 1.09. The conversion rates of VL and PO measured by $^1$H NMR are 84% and 85%. The theoretical number-average molecular weights $M_{n,th}$(PVL), $M_{n,th}$(PPO) and $M_{n,th}$(PVL-b-PBO diblock ester-ether copolymer) are 12.6 kg/mol, 12.3 kg/mol and 24.9 kg/mol. In this embodiment, the molar ratio of hydroxyl compounds and organic bases before catalytic conversion is 1:0.1; the molar ratio of hydroxyl compounds, organic bases and alkyl boranes after catalytic conversion is 1:0.1:0.3.

Embodiment 22

Stepwise adding monomers, using a small molecular diol as an initiator, and a metal-free Lewis acid-base pair as a catalyst, the continuous copolymerization of BO and CL is carried out, and a PCL-b-PBO-b-PCL triblock ether-ester copolymer is prepared by a one-pot method. The specific operations are as follows.

BDM, BO and CL are used after water removal. In an inert atmosphere, 1 part of BDM and 150 parts of BO are added to a dry glass reactor, and stirred and mixed well (where $[BO]_0$=11.0 mol $L^{-1}$). After BDM is completely dissolved, a mixed solution of 0.3 part of TPB and 0.1 part of phosphazene base t-Bu$P_2$ is added and stirred at room temperature for 21 h. Then 0.5 parts of t-Bu$P_2$, an appropriate amount of THF and 150 parts of CL (where $[CL]_0$=5.0 mol $L^{-1}$) are added in sequence, and the reaction is continued for 8 h. The molecular weight and dispersion of the crude product measured by SEC are 26.1 kg/mol and 1.16. The conversion rates of BO and CL measured by $^1$H NMR are 88% and 90%. The theoretical number-average molecular weights $M_{n,th}$(PBO), $M_{n,th}$(PCL) and $M_{n,th}$(PCL-b-PBO-b-PCL triblock ether-ester copolymer) are 9.5 kg/mol, 2×7.7 kg/mol and 24.9 kg/mol. In this embodiment, the molar ratio of hydroxyl compounds, organic bases and alkyl boranes before catalytic conversion is 1:0.1:0.3; the molar ratio of hydroxyl compounds, organic bases and alkyl boranes after catalytic conversion is 1:0.6:0.3.

By adjusting the ratio of the acid-base components in the Lewis acid-base pair, the selective polymerization of epoxy or cyclic ester monomers by the catalytic system can be adjusted. Therefore, the three-component catalytic initiating system provided by the present invention can also be used to prepare traditional ether-ester block copolymers. Embodiments 22-32 start from small molecular hydroxyl compounds, and the general reaction formula of the polyether-b-polyester copolymer obtained in one pot and two steps is as follows:

Stepwise addition of monomers, one-pot two-step method to prepare polyether-b-polyester

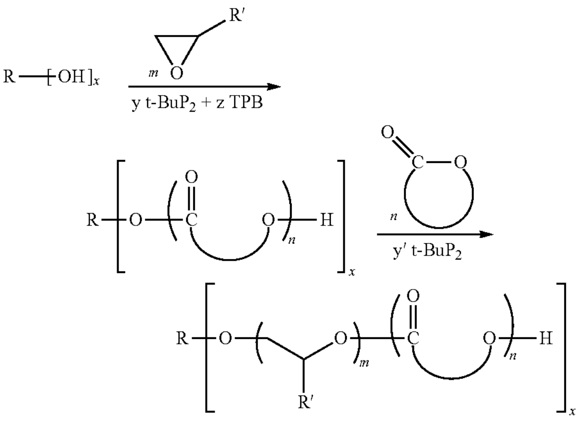

x = 1, 2, 3, 4 . . .
0.01 < y < 1, 0.01 < z < 10, 1 < (y + y')/z < 3

Simultaneous addition of monomers, one-pot two-step method to prepare polyether-b-polyester

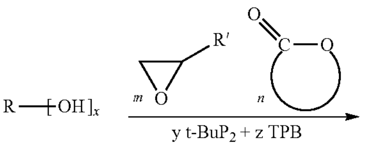

-continued

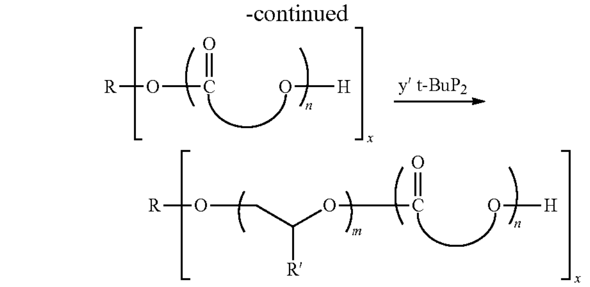

x = 1, 2, 3, 4 . . .

0.01 < y < 1, 0.01 < z < 10, 1 < (y + y')/z < 3

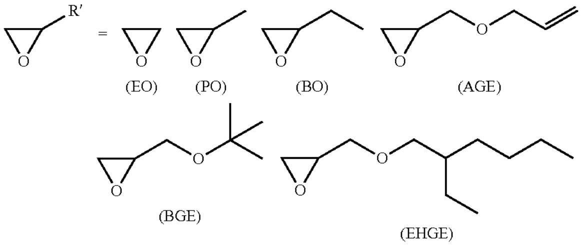

(EO) (PO) (BO) (AGE)

(BGE) (EHGE)

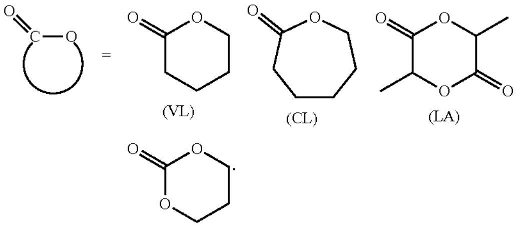

(VL) (CL) (LA)

(TMC)

Embodiment 23

On the basis of embodiment 22, the amount of the hydroxyl compound is kept unchanged, the amount of phosphazene base t-$BuP_2$ added in the first step is changed to 0.01 part, and the amount of TPB is changed to 0.1 part; the amount of t-$BuP_2$ added in the second step is changed to 0.14 part, and other conditions remain unchanged. The molecular weight and dispersion of the crude product measured by SEC are 20.3 kg/mol and 1.12. The conversion rates of BO and CL measured by $^1$H NMR are 76% and 58%. The theoretical number-average molecular weights $M_{n,th}$(PBO), $M_{n,th}$(PCL) and $M_{n,th}$(PCL-b-PBO-b-PCL are 8.2 kg/mol, 2×5.0 kg/mol and 18.2 kg/mol. In this embodiment, the molar ratio of hydroxyl compounds, organic bases and alkyl boranes before catalytic conversion is 1:0.01:0.1; the molar ratio of hydroxyl compounds, organic bases and alkyl boranes after catalytic conversion is 1:0.15:0.1.

Embodiment 24

Stepwise adding monomers, using a small molecular diol as an initiator, and a metal-free Lewis acid-base pair as a catalyst, the continuous copolymerization of allyl glycidyl ether (AGE) and CL is carried out, and a PCL-b-PAGE-b-PCL triblock ether-ester copolymer is prepared. The specific operations are as follows.

BDM, AGE and CL are used after water removal. In an inert atmosphere, 1 part of BDM and 100 parts of AGE are added to a dry glass reactor, and stirred and mixed well (where $[AGE]_0$=7.8 mol $L^{-1}$). After the initiator is completely dissolved, a mixed solution of 0.4 part of TPB and 0.1 part of phosphazene base t-$BuP_2$ is added and stirred at room temperature for 21 h. Then 0.7 parts of t-$BuP_2$, an appropriate amount of THF and 170 parts of CL (where $[CL]_0$=4.6 mol $L^{-1}$) are added in sequence, and the reaction is continued for 10 h. The molecular weight and dispersion of the crude product measured by SEC are 29.7 kg/mol and 1.20. The conversion rates of AGE and CL measured by $^1$H NMR are 78% and 99%. The theoretical number-average molecular weights $_{n,th}$(PAGE), $M_{n,th}$(PCL) and $M_{n,th}$(PCL-b-PAGE-b-PCL triblock ether-ester copolymer) are 8.9 kg/mol, 2×9.6 kg/mol and 28.1 kg/mol. In this embodiment, the molar ratio of hydroxyl compounds, organic bases and alkyl boranes before catalytic conversion is 1:0.1:0.4; the molar ratio of hydroxyl compounds, organic bases and alkyl boranes after catalytic conversion is 1:0.8:0.4.

Embodiment 25

On the basis of embodiment 24, the amount of the hydroxyl compound is kept unchanged, the amount of t-$BuP_2$ added in the first step is changed to 1 part, and the amount of TPB ias changed to 10 parts; the amount of t-$BuP_2$ added in the second step is changed to 19 parts, the polymerization time of CL is shortened to 3 h, and other conditions remain unchanged. The molecular weight and dispersion of the crude product measured by SEC are 34.1 kg/mol and 1.25. The conversion rates of AGE and CL measured by $^1$H NMR are 96% and 100%. The theoretical number-average molecular weights $M_{n,th}$(PAGE), $M_{n,th}$(PCL) and $M_{n,th}$(PCL-b-PAGE-b-PCL triblock ester-ether copolymer) are 11.0 kg/mol, 2×9.7 kg/mol and 30.4 kg/mol. In this embodiment, the molar ratio of hydroxyl compounds, organic bases and alkyl boranes before catalytic conversion is 1:1:10; the molar ratio of hydroxyl compounds, organic bases and alkyl boranes after catalytic conversion is 1:20:10.

Embodiment 26

Stepwise adding monomers, using a small molecular diol as an initiator, and a metal-free Lewis acid-base pair as a catalyst, the continuous copolymerization of octyl glycidyl ether (EHGE) and CL is carried out, and a PCL-b-PEHGE-b-PCL triblock ether-ester copolymer is prepared. The specific operations are as follows.

BDM, EHGE and CL are used after water removal. In an inert atmosphere, 1 part of BDM (THF solution, 0.5 mol $L^{-1}$) and 80 parts of EHGE are added to a dry glass reactor, and stirred and mixed well (where $[EHGE]_0$=4.0 mol $L^{-1}$). A mixed solution of 0.5 part of TPB and 0.1 part of phosphazene base t-$BuP_2$ is added and stirred at room temperature for 24 h. Then 0.7 parts of t-$BuP_2$, an appropriate amount of THF and 170 parts of CL (where $[CL]_0$=4.4 mol $L^{-1}$) are added in sequence, and the reaction is continued for 10 h. The molecular weight and dispersion of the crude product measured by SEC are 30.5 kg/mol and 1.21. The conversion rates of EHGE and CL measured by $^1$H NMR are 80% and 90%. The theoretical number-average molecular weights $M_{n,th}$(PEHGE), $M_{n,th}$(PCL) and $M_{n,th}$(PCL-b-PEHGE-b-PCL triblock ether-ester copolymer) are 11.9 kg/mol, 2×8.7 kg/mol and 29.3 kg/mol. In this embodiment, the molar ratio of hydroxyl compounds, organic bases and alkyl boranes before catalytic conversion is 1:0.1:0.5; the molar ratio of hydroxyl compounds, organic bases and alkyl boranes after catalytic conversion is 1:0.8:0.5.

The three-component catalytic initiating system is used to first generate polyethers and then polyesters to prepare a ether-ester block copolymer by a one-pot method. Epoxy monomers have different polymerization activity due to the differences in the electronic effect and steric-hindrance effect of the substituents, and the polymerization efficiency can be improved by appropriately increasing the overall amount of alkyl boranes or Lewis acid-base pairs. In addition, econdary hydroxyl groups with large sterically hindered side groups are obtained after the first step of substituted epoxy polymerization to initiate the ring-opening polymerization of the second-step cyclic esters, which results in the problem of different activity of the initiating end (secondary hydroxyl group) and the propagating end (primary hydroxyl group). Therefore, in some acidic catalytic systems, it is difficult to avoid the problem of slow initiation when first polymerizing epoxies with large sterically hindered side groups, and then growing polyesters from a macroinitiator. In the Lewis acid-base pair catalytic system used in the present invention, there is no observed slow initiation phenomenon. $^1$H NMR results indicate that the obtained product is a well-defined ether-ester block copolymer.

Embodiment 27

Simultaneously adding monomers, using a small molecular diol as an initiator, and a metal-free Lewis acid-base pair as a catalyst, the continuous copolymerization of EO and CL is carried out, and an amphiphilic PCL-b-PEO-b-PCL triblock ether-ester copolymer is prepared. The specific operations are as follows.

BDM, EO and CL are used after water removal. In an inert atmosphere, 1 part of dry BDM, 180 parts of CL, 0.1 part of phosphazene base t-Bu$P_2$ and 0.3 part of TPB are added to a glass reactor and stirred until homogeneous. The glass reactor is connected to a vacuum line, part of the gas in the reactor is removed, and an ice-water bath is used to cool down. 170 parts of dry EO (where $[EO]_0$=5.9 mol $L^{-1}$, $[CL]_0$=6.2 mol $L^{-1}$) are added at −20° C., and the reaction is continued in a sealed glass reactor for 6 h at room temperature. 0.4 part of t-Bu$P_2$ is added, and the reaction is continued for 0.8 h at room temperature. The molecular weight and dispersion of the crude product measured by SEC are 11.1 kg/mol and 1.15. The conversion rates of EO and CL measured by $^1$H NMR are 100% and 33%. The theoretical number-average molecular weights $M_{n,th}$(PEO), $M_{n,th}$(PCL) and $M_{n,th}$(copolymer) are 7.5 kg/mol, 2×3.4 kg/mol and 14.3 kg/mol. The molecular weights $M_{n,NMR}$ (PEO), $M_{n,NMR}$(PCL) and $M_{n,NMR}$(PCL-b-PEO-b-PCL triblock ether-ester copolymer) of the purified product measured by $^1$H NMR are 5.9 kg/mol, 2×2.8 kg/mol and 11.5 kg/mol. In this embodiment, the molar ratio of hydroxyl compounds, organic bases and alkyl boranes before catalytic conversion is 1:0.1:0.3; the molar ratio of hydroxyl compounds, organic bases and alkyl boranes after catalytic conversion is 1:0.5:0.3.

Compared with embodiment 7, the mass fraction $W_{PEO}$ of the hydrophilic block PEO in the amphiphilic PCL-b-PEO-b-PCL copolymer synthesized in this embodiment is 51%. Although $W_{PEO}$ is slightly improved, the copolymer is insoluble in water since PEO is an internal block.

Embodiment 28

On the basis of embodiment 27, the amount of the hydroxyl compound is kept unchanged, the amount of phosphazene base t-Bu$P_2$ added in the first step is changed to 0.01 part, the amount of TPB ias changed to 0.01 part, and the polymerization time of EO is extended to 24 h; the amount of t-Bu$P_2$ added in the second step is changed to 0.005 part, the polymerization time of CL is extended to 10 h, and other conditions remain unchanged. The molecular weight and dispersion of the crude product measured by SEC are 27.1 kg/mol and 1.18. The conversion rates of EO and CL measured by $^1$H NMR are 100% and 83%. The theoretical number-average molecular weights $M_{n,th}$(PEO), $M_{n,th}$(PCL) and $M_{n,th}$(PCL-b-PEO-b-PCL triblock ester-ether copolymer) are 7.5 kg/mol, 2×8.5 kg/mol and 24.5 kg/mol. In this embodiment, the molar ratio of hydroxyl compounds, organic bases and alkyl boranes before catalytic conversion is 1:0.01:0.01; the molar ratio of hydroxyl compounds, organic bases and alkyl boranes after catalytic conversion is 1:0.015:0.01.

Embodiment 29

On the basis of embodiment 27, t-Bu$P_2$ is replaced with 1-ethyl-2,2,4,4,4-penta(dimethylamino)-2$\lambda^5$,4$\lambda^5$-di(phosphorus nitrogen compound) (Et$P_2$), and other conditions remain unchanged. The molecular weight and dispersion of the crude product measured by SEC are 15.0 kg/mol and 1.10. The conversion rates of EO and CL measured by $^1$H NMR are 100% and 31%. The theoretical number-average molecular weights $M_{n,th}$(PEO), $M_{n,th}$(PCL) and $M_{n,th}$(PCL-b-PEO-b-PCL triblock ester-ether copolymer) are 7.5 kg/mol, 2×3.2 kg/mol and 13.9 kg/mol.

Embodiment 30

On the basis of embodiment 27, TPB is replaced with tri-sec-butylborane, and other conditions remain unchanged. The molecular weight and dispersion of the crude product measured by SEC are 15.8 kg/mol and 1.12. The conversion rates of EO and CL measured by $^1$H NMR are 88% and 36%. The theoretical number-average molecular weights $M_{n,th}$ (PEO), $M_{n,th}$(PCL) and $M_{n,th}$(PCL-b-PEO-b-PCL triblock ester-ether copolymer) are 6.6 kg/mol, 2×3.7 kg/mol and 14.0 kg/mol.

Embodiment 31

Simultaneously adding monomers, using a small molecular diol as an initiator, and a metal-free Lewis acid-base pair as a catalyst, the continuous copolymerization of PO and VL is carried out, and a PVL-b-PPO-b-PVL triblock ether-ester copolymer is prepared. The specific operations are as follows.

BDM, PO and VL are used after water removal. In an inert atmosphere, 1 part of dry BDM, 200 parts of PO, 150 parts of VL, 0.1 part of phosphazene base t-Bu$P_2$ and 0.3 part of TPB are added to a glass reactor and stirred well (where $[PO]_0$=6.4 mol $L^{-1}$, $[VL]_0$=5.9 mol $L^{-1}$), and react at room temperature for 48 h. 0.4 part of t-Bu$P_2$ is added, and the reaction is continued for 0.8 h at room temperature. The molecular weight and dispersion of the crude product measured by SEC are 25.8 kg/mol and 1.10. The conversion rates of PO and VL measured by $^1$H NMR are 90% and 99%. The theoretical number-average molecular weights $M_{n,th}$ (PPO), $M_{n,th}$(PVL) and $M_{n,th}$(PVL-b-PPO-b-PVL triblock ether-ester copolymer) are 10.5 kg/mol, 2×7.4 kg/mol and 25.3 kg/mol. In this embodiment, the molar ratio of hydroxyl compounds, organic bases and alkyl boranes before catalytic conversion is 1:0.1:0.3; the molar ratio of hydroxyl compounds, organic bases and alkyl boranes after catalytic conversion is 1:0.5:0.3.

The $^1$H NMR results demonstrate that the obtained product is a strict block copolymer, no VL monomer is inserted during PO polymerization in the first step, and no PO monomer is inserted during VL polymerization in the second step, indicating that the two steps of polymerization both have a high degree of selectivity. The selective switching is controlled by the addition of t-$BuP_2$, and the switching of the catalytic activity is very rapid.

Embodiment 32

Simultaneously adding monomers, using a small molecular diol as an initiator, and a metal-free Lewis acid-base pair as a catalyst, the continuous copolymerization of tert-butyl glycidyl ether (BGE) and CL is carried out, and a PCL-b-PBGE-b-PCL triblock ether-ester copolymer is prepared. The specific operations are as follows.

BDM, BGE and CL are used after water removal. In an inert atmosphere, 1 part of dry BDM, 120 parts of BGE, 120 parts of CL, 0.1 part of phosphazene base t-$BuP_2$ and 0.3 part of TPB are added to a glass reactor and stirred well, and the reaction is carried out at room temperature for 48 h (where $[BGE]_0$=3.5 mol $L^{-1}$, $[CL]_0$=4.4 mol $L^{-1}$). 0.35 part of t-$BuP_2$ is added, and the reaction is continued for 8 h at room temperature. The molecular weight and dispersion of the crude product measured by SEC are 25.3 kg/mol and 1.15. The conversion rates of BGE and CL measured by $^1$H NMR are 90% and 90%. The theoretical number-average molecular weights $M_{n,th}$(PBGE), $M_{n,th}$(PCL) and $M_{n,th}$ (PCL-b-PBGE-b-PCL triblock ether-ester copolymer) are 14.1 kg/mol, 2×6.2 kg/mol and 26.5 kg/mol. In this embodiment, the molar ratio of hydroxyl compounds, organic bases and alkyl boranes before catalytic conversion is 1:0.1:0.3; the molar ratio of hydroxyl compounds, organic bases and alkyl boranes after catalytic conversion is 1:0.45:0.3.

In embodiment 24 and embodiment 32, allyl glycidyl ether and tert-butyl glycidyl ether are block copolymerized with CL, respectively, to obtain block copolymers with controllable molecular weights and functional side groups. Such copolymers can obtain block materials with richer structures and properties by chemical modification of the pendant groups through post-polymerization modification (deprotection, click reaction) and the like.

The above embodiments are the preferred implementation of using the metal-free Lewis acid-base catalytic system provided by the present invention to carry out the continuous ring-opening polymerization of aliphatic cyclic esters and epoxies by a one-pot method to prepare ester-ether and ether-ester copolymers with various block structures. However, the embodiments of the present invention are not limited by the above embodiments, and any other changes, modifications, substitutions, combinations, and simplifications that do not deviate from the spirit and principle of the present invention should be equivalent substitution methods, and are included in the protection scope of the present invention.

What is claimed is:

1. A method for sequence controllable block copolymerization of a cyclic ester monomer and an epoxy monomer, comprising:

in an inert atmosphere, adding the epoxy monomer into a catalytic initiating system comprising a hydroxyl compound, a first organic base and an alkyl borane for reaction, so as to obtain a polyether; then adding a second organic base for catalytic conversion, and adding the cyclic ester monomer for reaction, so as to obtain a polyether-b-polyester, wherein before the catalytic conversion, a molar ratio of the hydroxyl compound, the first organic base, and the alkyl borane in the catalytic initiating system is 1:(0.01-1):(0.01-10), and after the catalytic conversion, a molar ratio of the hydroxyl compound, a total of the first organic base and the second organic base, and the alkyl borane in the catalytic initiating system is 1:(0.015-20):(0.01-10).

2. The method for sequence controllable block copolymerization of the cyclic ester monomer and the epoxy monomer according to claim 1, wherein the epoxy monomer is selected from the group consisting of more than one of ethylene oxide, linear alkyl ethylene oxide with an alkyl having 1-20 carbon atoms, linear alkyl glycidyl ether with an alkyl having 1-16 carbon atoms, isopropyl glycidyl ether, tert-butyl glycidyl ether, 2-ethylhexyl glycidyl ether, phenyl glycidyl ether, benzyl glycidyl ether, allyl glycidyl ether, propargyl glycidyl ether, and glycidyl methacrylate;

the cyclic ester monomer is selected from the group consisting of more than one of β-butyrolactone, δ-valerolactone, δ-linear alkyl valerolactone with an alkyl having 1-12 carbon atoms, ε-caprolactone, ε-decalactone, rac-lactide, L-lactide, D-lactide, trimethylene carbonate, 5,5-dimethyl-1,3-dioxan-2-one, and 5-methyl-5-propyl-1,3-dioxan-2-one; the first organic base and the second organic base are selected from the group consisting of more than one of tertiary amines, amidines, guanidines, triaminophosphines, and phosphazene bases; the alkyl borane is selected from the group consisting of more than one of β-isopinocampheyl-9-boronbicyclo [3.3.1] nonane, tri-sec -butylborane, triisopropylborane, trimethylborane, and tri(linear)alkylborane, and wherein a carbon chain length of the tri(linear)alkylborane is 1-8.

3. The method for sequence controllable block copolymerization of the cyclic ester monomer and the epoxy monomer according to claim 1, wherein when the epoxy monomer undergoes an epoxy polymerization reaction, the epoxy polymerization reaction is carried out in a bulk of the epoxy monomer, or in a solvent of cyclic ester, benzene, toluene, tetrahydrofuran, 2-methyltetrahydrofuran, n-hexane, cyclohexane, acetone, N,N-dimethylformamide, N,N-dimethylacetamide or dimethyl sulfoxide; when the cyclic ester monomer undergoes a cyclic ester polymerization reaction, the cyclic ester polymerization reaction is carried out in a bulk of the cyclic ester monomer, or in a solvent of epoxide, benzene, toluene, tetrahydrofuran, 2-methyltetrahydrofuran, n-hexane, cyclohexane, acetone, N,N-dimethylformamide, N,N-dimethylacetamide or dimethyl sulfoxide; a temperature of the cyclic ester polymerization reaction and the epoxy polymerization reaction is 20-60° C., time for the cyclic ester polymerization reaction is 0.5-24 h, and time for the epoxy polymerization reaction is 1-48 h; and wherein a concentration of the epoxy monomer in the catalytic initiating system is 3-15 mol/L, and a concentration of the cyclic ester monomer in the catalytic initiating system is 1-15 mol/L.

* * * * *